United States Patent [19]

Torobin

[11] 4,303,431

[45] Dec. 1, 1981

[54] METHOD AND APPARATUS FOR PRODUCING HOLLOW MICROSPHERES

[76] Inventor: Leonard B. Torobin, c/o Materials Technology Corp., P.O. Box 6844, Bellevue, Wash. 98007

[21] Appl. No.: 152,693

[22] Filed: May 23, 1980

Related U.S. Application Data

[63] Continuation of Ser. No. 59,297, Jul. 20, 1979, abandoned, which is a continuation-in-part of Ser. No. 937,123, Aug. 28, 1978, abandoned, and a continuation-in-part of Ser. No. 944,643, Sep. 21, 1978, abandoned.

[51] Int. Cl.³ .................. C03B 19/10; C03C 25/02
[52] U.S. Cl. .......................... 65/21.4; 65/22; 65/142; 65/60.4; 264/5; 264/12; 264/514; 264/574; 425/7; 425/462
[58] Field of Search .................. 65/2, 21.4, 21.5, 22, 65/60 C, 142; 264/5, 12, 514, 574; 425/7, 462

[56] References Cited

U.S. PATENT DOCUMENTS

| | | | |
|---|---|---|---|
| 948,541 | 2/1910 | Coleman | 65/22 X |
| 1,871,792 | 8/1932 | Horsfield | 65/21 |
| 2,187,432 | 1/1940 | Powers | 65/22 X |
| 2,907,626 | 10/1959 | Eisen et al. | 65/3.31 |
| 3,186,812 | 6/1965 | Pfaender | 65/55 |
| 3,278,660 | 10/1966 | Alford et al. | 264/56 |
| 3,365,315 | 1/1968 | Beck et al. | 65/22 |
| 3,421,873 | 1/1969 | Burgman et al. | 65/2 |
| 3,607,169 | 9/1971 | Coxe | 65/21 |
| 3,615,972 | 10/1971 | Morehouse | 156/79 |
| 3,765,853 | 10/1973 | Reibling | 65/18 |
| 3,904,377 | 9/1975 | Honda et al. | 29/180 |
| 3,955,956 | 5/1976 | Terner | 65/21 |
| 4,079,162 | 3/1978 | Metzger | 428/406 X |
| 4,111,713 | 9/1978 | Beck | 65/21 X |
| 4,116,656 | 9/1978 | Mukai et al. | 65/5 |
| 4,173,969 | 11/1979 | Schöll | 126/417 |

FOREIGN PATENT DOCUMENTS

49-5722 2/1974 Japan.

OTHER PUBLICATIONS

Journal of Applied Physics, vol. 47 #6, pp. 2502-2508, Reedy, Jun. 1976.
Materials Science and Engineering, "Syntactic Carbon Foams", vol. 12, pp. 219-233, 1973.

*Primary Examiner*—Robert L. Lindsay, Jr.
*Attorney, Agent, or Firm*—Perry Carvellas

[57] ABSTRACT

Hollow glass microspheres made from a low heat conductivity glass composition containing a high vacuum and a thin metal coating deposited on the inner wall surface of the microspheres are described. The hollow glass microspheres are used to make superior insulation materials in the construction of highly efficient solar energy collectors.

The hollow glass microspheres are made by forming a liquid film of molten glass across a coaxial blowing nozzle, applying a metal vapor blowing gas at a positive pressure on the inner surface of the glass film to blow the film and form an elongated cylinder shaped liquid film of molten glass. A transverse jet is used to direct an inert entraining fluid over and around the blowing nozzle at an angle to the axis of the blowing nozzle. The entraining fluid as it passes over and around the blowing nozzle fluid dynamically induces a pulsating or fluctuating pressure field at the opposite or lee side of the blowing nozzle in the wake or shadow of the coaxial blowing nozzle. The continued movement of the entraining fluid over the elongated cylinder produces asymmetric fluid drag forces on the cylinder and closes and detaches the elongated cylinder from the coaxial blowing nozzle and the detached cylinder by the action of surface tension forms into a spherical shape.

Quench nozzles are disposed below and on either side of the blowing nozzle and direct cooling fluid at and into contact with the molten glass microspheres to rapidly cool and solidify the molten glass to form a hard, smooth hollow glass microsphere and to cool and condense the metal vapor and to deposit the metal vapor on the inner wall surface of the microsphere as a thin reflective metal coating or transparent metal coating.

59 Claims, 13 Drawing Figures

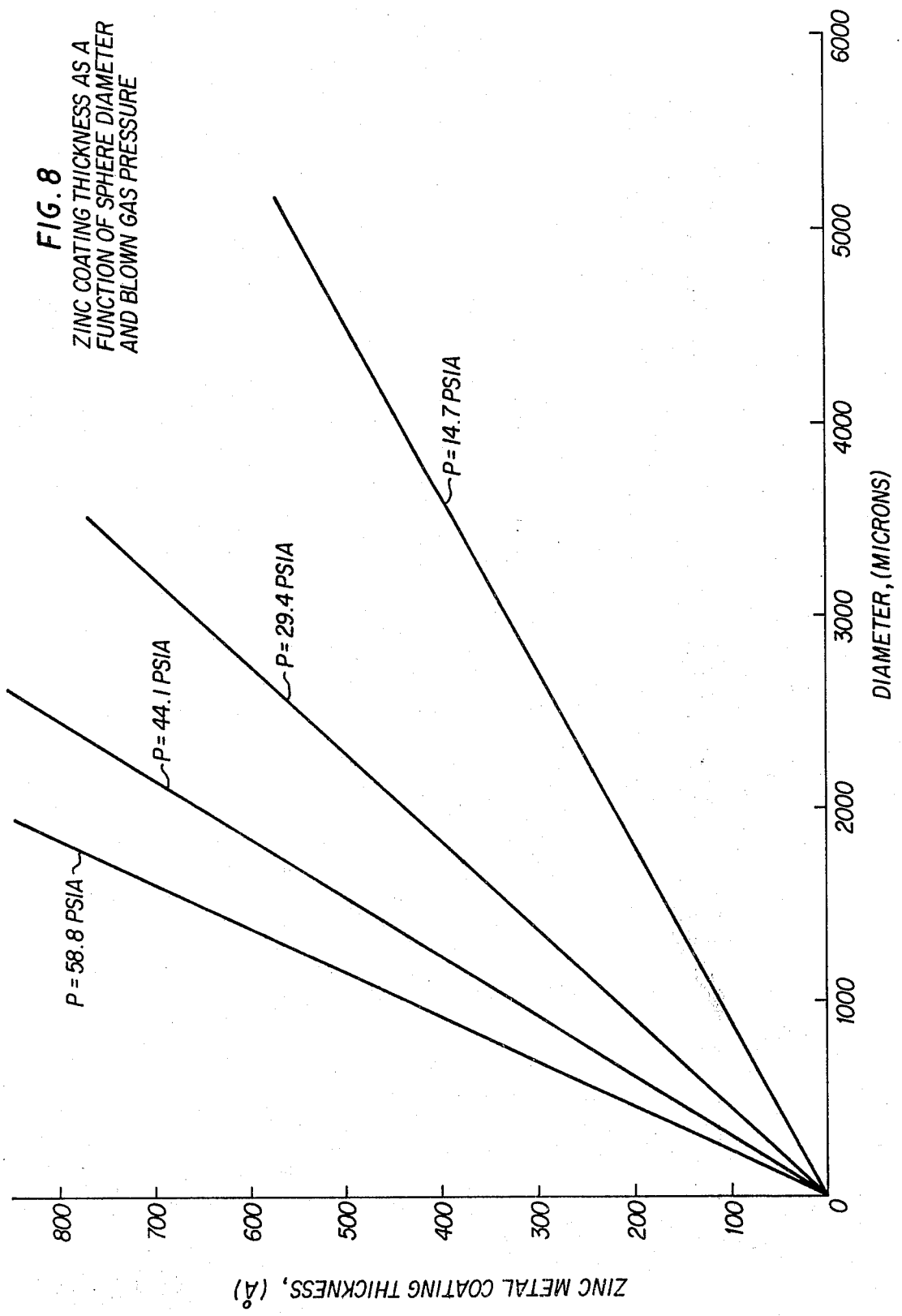

METHOD AND APPARATUS FOR PRODUCING HOLLOW MICROSPHERES

This is a continuation of application Ser. No. 59,297, filed July 20, 1979 which application is a continuation-in-part of applicant's applications Ser. No. 937,123 filed Aug. 28, 1978 and Ser. No. 944,643 filed Sept. 21, 1978 all abandoned.

SUMMARY OF THE INVENTION

The present invention relates to hollow microspheres made from inorganic film forming materials and compositions and particularly to hollow glass microspheres and to a process and apparatus for making the microspheres.

The present invention particularly relates to hollow glass vacuum microspheres having a thin transparent metal coating deposited on the inner wall surface of the microsphere.

The present invention also relates to hollow glass vacuum microspheres having a thin reflective metal coating deposited on the inner wall surface of the microsphere.

The present invention relates to hollow glass microspheres for use as a filler material in plastics, in plastic foam compositions and in concrete and asphalt compositions.

The present invention relates to a method and apparatus for using a coaxial blowing nozzle to blow microspheres from liquid glass compositions comprising subjecting the microsphere during its formation to an external pulsating or fluctuating pressure field having periodic oscillations, said pulsating or fluctuating pressure field acting on said microsphere to assist in its formation and to assist in detaching the microsphere from said blowing nozzle.

The invention particularly relates to a method and apparatus for blowing the microspheres from inorganic film forming materials or compositions and particularly to blowing microspheres from a molten glass using a coaxial blowing nozzle and an inert blowing gas or a metal vapor to blow the molten glass to form a hollow glass microsphere.

The invention also relates to a method and apparatus for blowing the microspheres from liquid glass compositions using a coaxial blowing nozzle and a blowing gas or a blowing gas containing dispersed metal particles and/or an organo metal compound to blow the liquid glass to form a hollow glass microsphere. The metal particles deposit and/or the organo metal compound decomposes to deposit a thin transparent or reflective metal coating on the inner wall surface of the microsphere.

A transverse jet is used to direct an inert entraining fluid over and around the blowing nozzle at an angle to the axis of the blowing nozzle. The entraining fluid as it passes over and around the blowing nozzle envelops and acts on the molten glass as it is being blown to form the microsphere and to detach the microsphere from the coaxial blowing nozzle. Quench means are disposed close to and below the blowing nozzles to direct a quench fluid onto the microspheres to rapidly cool and solidify the microspheres.

The present invention specifically relates to the use of the hollow glass microspheres and the hollow glass vacuum microspheres in the manufacture of superior insulation materials for use in construction of homes, factories and office buildings and in the manufacture of products in which heat barriers are desired or necessary and in particular in the construction of highly efficient solar energy collectors.

The present invention specifically relates to the use of the hollow glass microspheres as filler materials in syntactic foam systems.

The present invention also relates to a method and apparatus for making filamented glass microspheres with thin glass filaments connecting adjacent microspheres and to the filamented microspheres themselves.

The hollow glass microspheres of the present invention, depending on their diameter and their wall thickness and the particular glass composition from which they are made, are capable of withstanding relatively high external pressures and/or weight. Hollow glass microspheres can be made that are resistant to high temperatures and stable to many chemical agents and weathering conditions. These characteristics make the microspheres suitable for a wide variety of uses.

BACKGROUND OF THE INVENTION

In recent years, the substantial increases in the energy costs of heating and cooling has encouraged the development of new and better insulation materials and many new insulation materials have been developed in an attempt to satisfy this need. The same increases in energy costs have provided an incentive for adapting solar energy as a means for providing heating and cooling. The attempts to adapt solar energy for these uses would become more practical with the development of improved and more efficient insulating materials.

In recent years, the substantial increases in costs of basic materials such as plastics, cement, asphalt and the like has also encouraged development and use of filler materials to reduce the amount and cost of the basic materials used and the weight of the finished materials. One of the newly suggested filler materials utilizes hollow glass microspheres. The known methods for producing hollow glass microspheres for use as filler materials, however, have not been successful in producing microspheres of uniform size or uniform thin walls which makes it very difficult to produce filler and insulation materials of controlled and predictable physical and chemical characteristics and quality.

One of the newly developed insulation materials utilizes packed glass microspheres, the outer surface of which microspheres are coated with a reflective metal and a vacuum is maintained in the interstices area between the microspheres. The outer reflective metal coating minimizes heat transfer by radiation and a vacuum maintained in the interstices area minimizes heat transfer by gas conduction. Insulation materials, however, made from these types of microspheres possess several inherent disadvantages. It has been found to be difficult if not impossible in many applications to maintain the vacuum in the interstices area between the packed microspheres and loss of this vacuum increases the heat transfer by gas conduction. It has also been found very difficult and costly to deposit a relatively thin uniform film of reflective metal on the outer surface of the microspheres. Even where a suitable thin reflective coating of metal has been deposited on the outer surface of the microspheres, it is found that as the coating wears the area of point to point contact between the microspheres increases which increases heat transfer by solid conduction between the mircrospheres and the wearing of the reflective metal coating necessarily causes deterioration of the reflective metal surface and further increases heat transfer by radiation.

The known methods for producing hollow glass microspheres have not been successful in producing microspheres of relatively uniform size or uniform thin walls which makes it very difficult to produce insulation materials of controlled and predictable characteristics and quality.

One of the existing methods of producing hollow glass microspheres for use as insulating materials, for example, as disclosed in the Veatch et al U.S. Pat. No. 2,797,201 or Beck et al U.S. Pat. No. 3,365,315 involves dispersing a liquid and/or solid gas-phase precursor material in the glass material to be blown to form the microspheres. The glass material containing the solid or liquid gas-phase precursor enclosed therein is then heated to convert the solid and/or liquid gas-phase precursor material into a gas and is further heated to expand the gas and produce the hollow glass microsphere containing therein the expanded gas. This process is, understandably, difficult to control and of necessity, i.e. inherently, produces glass microspheres of random size and wall thickness, microspheres with walls that have sections or portions of the walls that are relatively thin, walls that have holes, small trapped bubbles, trapped or dissolved gases, any one or more of which will result in a substantial weakening of the microspheres, and a substantial number or proportion of microspheres which are not suitable for use and must be scrapped or recycled.

Further, the use of conventional fiberglass insulation is being questioned in the light of the recently discovered possibility that fiberglass of certain particle size may be carcinogenic in the same or similar manner as asbestos. The use of polyurethane foams, urea-formaldehyde foams and polystyrene foams as insulating materials have recently been criticized because of their dimensional and chemical instability, for example, a tendency to shrink and to evolve the blowing gases such as Freon and to evolve unreacted gases such as formaldehyde.

In addition, in some applications, the use of low density microspheres presents a serious problem because they are difficult to handle since they are readily elutriated and tend to blow about. In situations of this type, the filamented microspheres of the present invention provide a convenient and safe method of handling the microspheres.

It is also been suggested that hollow glass vacuum microspheres having a reflective metal deposited on the inner wall surface thereof be used to make insulating materials. There have been several methods suggested for making this type of hollow vacuum microsphere but to date none of the known methods are believed to have been successful in making any such microspheres.

Further, the existing methods practiced to produce hollow glass microspheres usually rely on high soda content glass compositions because of their relatively low melting points. These glass compositions, however, were found to have poor long term weathering characteristics.

Thus, the known methods for producing hollow glass microspheres have therefore not been successful in producing microspheres of uniform size or uniform thin walls or in producing hollow glass microspheres of controlled and predictable physical and chemical characteristics, quality and strength.

In addition, applicant found in his initial attempts to use an inert blowing gas to blow a thin molten glass film to form a hollow glass microsphere that the formation of the glass microsphere was extremely sensitive and that unstable films were produced which burst into minute sprays of droplets before a molten glass film could be blown into a microsphere and detached from a blowing nozzle. There was also a tendency for the molten glass fluid to creep up the blowing nozzle under the action of wetting forces. Thus, initial attempts to blow hollow glass microspheres from thin molten glass films were unsuccessful.

The attempts to use solar energy for heating and/or cooling have been hampered by the rapid increase in rate of heat loss to the surrounding atmosphere that occurs when the outside temperature is below 32° F. or when the operating temperature, i.e. outlet heat exchange medium of the solar energy collector, approaches 160° F. The lower the outside temperature or the higher the operating temperature of the solar energy collector, the greater the heat loss and the lower the efficiency of the solar collector. It has been found that with the commercially attractive insulation technology available that reasonably priced solar collectors have only been operated efficiently at outside temperatures above 32° F. and at operating temperatures below 160° F. Though this is sufficient for heating hot water for bathing and laundry uses and for providing household heat, it is not sufficient for heating at outside temperatures below 32° F. or for air-conditioner applications.

OBJECTS OF THE INVENTION

It is an object of the present invention to provide a process and an apparatus for making hollow glass microspheres.

It is another object of the present invention to utilize the hollow glass microspheres of the present invention in the manufacture of improved insulating materials and insulating systems.

It is another object of the present invention to make hollow glass microspheres for use as and/or in filler materials.

It is another object of the present invention to produce hollow glass microspheres having uniform thin walls which walls are substantially free of trapped gas bubbles or dissolved gases or solvents which can form bubbles and/or escape.

It is another object of the present invention to produce hollow glass microspheres which are substantially resistant to heat, chemical agents and alkali materials.

It is still another object of the present invention to utilize the hollow glass microspheres in the manufacture of syntactic foam systems and/or molded forms or shapes.

It is another object of the invention to produce hollow glass microspheres having thin walls of a low heat conductivity glass.

It is another object of the present invention to produce hollow glass microspheres having a low heat conductivity gas contained within the microsphere.

It is another object of the present invention to produce hollow glass vacuum microspheres having deposited on the inner wall surface thereof a thin transparent metal coating.

It is another object of the present invention to produce hollow glass vacuum microspheres having deposited on the inner wall surface thereof a low emissivity reflective metal coating.

It is another object of the present invention to produce in an economical simple manner hollow glass microspheres which are substantially spherical in shape, uniform in size, wall thickness, and strength and thermal insulating characteristics.

It is another object of the present invention to utilize the hollow glass microspheres of the present invention in the manufacture of superior insulation materials and/or for use in the manufacture of formed wall panels.

It is still another object of the present invention to utilize the hollow glass microspheres in the construction and manufacture of superior insulating materials for high temperature applications and the retardation of fires.

It is another object of the present invention to produce hollow glass filamented microspheres with a thin glass filament connecting adjacent glass microspheres.

It is still another object of the present invention to utilize the hollow glass microspheres of the present invention in the manufacture of superior insulation materials for use in the construction of highly efficient solar energy collectors.

BRIEF DESCRIPTION OF THE INVENTION

The present invention relates to hollow glass microspheres and to a process and apparatus for making the microspheres. The present invention more particularly relates to the use of hollow glass microspheres in the manufacture of superior insulation materials and systems and improved filler materials.

The microspheres are made from a glass composition or a low heat conductivity glass composition and can contain a low heat conductivity gas. The microspheres can also be made to contain a high vacuum and a thin metal coating deposited on the inner wall surface of the microspheres.

The microspheres can also be made to contain a gas at above or below or at about ambient pressure and a thin metal coating deposited on the inner wall surface of the microspheres.

The metal coating, depending on its thickness, can be transparent or highly reflective. The use of a high vacuum and a reflective metal coating substantially improves the insulating characteristics of the microspheres.

The use of microspheres with a reflective metal coating but without a high vacuum still improves the heat insulating characteristics of the microspheres.

The glass microspheres of the present invention can be used to form a heat barrier by using them to fill void spaces between existing walls or other spaces and by forming them into sheets or other shaped forms to be used as insulation barriers. When used to form insulation barriers, the interstices between the microspheres can be filled with a low heat conductivity gas, foam or other material all of which increase the heat insulation characteristics of the materials made from the microspheres.

A particular and advantageous use of the hollow glass vacuum microspheres is to make transparent and reflective insulation materials for the construction of improved solar energy collectors.

The hollow glass microspheres of the present invention are made by forming a liquid film of molten glass across a coaxial blowing nozzle, applying an inert gas or metal vapor at a positive pressure on an inner surface of the glass film to blow the film and form an elongated cylinder shaped liquid film of molten glass which is closed at its outer end.

The hollow glass microspheres of the present invention can also be made by applying a gas or a gas containing dispersed metal particles and/or a gaseous organo metal compound at a positive pressure to the inner surface of the glass film to blow the film and form an elongated cylinder shaped liquid film of glass which is closed at its outer end. A balancing but slightly lower gas pressure is provided in the area of the blowing nozzle into which the elongated cylinder shaped liquid glass film is blown.

A transverse jet is used to direct an entraining fluid over and around the blowing nozzle at an angle to the axis of the blowing nozzle. The entraining fluid as it passes over and around the blowing nozzle and the elongated cylinder fluid dynamically induces a pulsating or fluctuating pressure field at the opposite or lee side of the blowing nozzle in the wake or shadow of the blowing nozzle. The fluctuating pressure field has regular periodic lateral oscillations similar to those of a flag flapping in a breeze.

The transverse jet entraining fluid can also be pulsed at regular intervals to assist in controlling the size of the microspheres and in separating the microspheres from the blowing nozzle and the distance or spacing between microspheres.

The entraining fluid envelops and acts asymmetrically on the elongated cylinder and causes the cylinder to flap, fold, pinch and close-off at its inner end at a point proximate to the coaxial blowing nozzle. The continued movement of the entraining fluid over the elongated cylinder produces fluid drag forces on the cylinder and detaches the elongated cylinder from the coaxial blowing nozzle to have it fall free from the blowing nozzle. The surface tension forces of the molten glass act on the now free, entrained elongated cylinder and cause the cylinder to seek a minimum surface area and to form a spherical shape.

Quench nozzles are disposed below and on either side of the blowing nozzle and direct cooling fluid at and into contact with the molten glass microspheres to rapidly cool and solidify the molten glass and form a hard, smooth hollow glass microsphere. Where a metal vapor is used as a blowing gas to blow the microspheres, the quench fluid cools and condenses the metal vapor and causes the metal vapor to deposit on the inner wall surface of the microsphere as a transparent metal coating or a thin reflective metal coating.

In one embodiment of the invention, the microspheres are coated with an adhesive or foam filler and flattened to an oblate spheriod or a generally cellular shape. The microspheres are held in the flattened position until the adhesive hardens and/or cures after which the microspheres retain their flattened shape. The use of the flattened microspheres substantially reduces the volume of the interstices between the microspheres and significantly improves the thermal insulating characteristics of the microspheres.

The microspheres can be made from glass compositions selected for their desired optical and chemical properties and for the particular gaseous material to be contained therein.

Where a gas containing dispersed metal particles is used to blow the microspheres, a metal layer is deposited on the inner wall surface of the microsphere as a thin metal coating. Where a gaseous organo metal compound is used to deposit the metal layer, a gaseous organo metal compound is used as or with the blowing gas to blow the microspheres. The organo metal compound can be decomposed just prior to blowing the microspheres or after the microspheres are formed by, for example, subjecting the blowing gas or the microspheres to heat and/or an electrical discharge.

The filamented microspheres are made in a manner such that they are connected or attached to each other by a thin continuous glass filament. The filamented microspheres can also be flattened to produce the oblate spheroids. The filaments interrupt and reduce the area of wall to wall contact between the microspheres and reduce the thermal conductivity between the walls of the microspheres. The filamented microspheres also assist in handling and preventing scattering of microspheres, particularly where very small diameter microspheres or low density microspheres are produced. The filamented microspheres have a distinct advantage over the simple addition of filaments in that the continuous filaments do not tend to settle in the system in which they are used.

THE ADVANTAGES

The present invention overcomes many of the problems associated with prior attempts to produce hollow glass microspheres and hollow glass vacuum microspheres containing a metal coating deposited on the inner wall surface thereof. The process and apparatus of the present invention allows the production of hollow glass microspheres having predetermined characteristics such that superior insulation materials and systems and improved filler materials can be designed, manufactured and tailor made to suit a particular desired use. The diameter, wall thickness and uniformity and the thermal, strength and chemical resistance characteristics of the microspheres can be determined by carefully selecting the constituents of the glass composition and controlling the inert gas or metal vapor pressure and the temperature, and the temperature, viscosity, surface tension, and thickness of the molten glass film from which the microspheres are formed. The inner volume of the microspheres may contain an inert low conductivity gas used to blow the microsphere or can contain a high vacuum produced by condensing a metal vapor used to blow the microsphere. The hollow glass microspheres and the hollow glass vacuum microspheres of the present invention can have a transparent metal coating deposited on the inner wall surface thereof which allows sun light to pass through the microspheres but reflects and traps infrared radiations. The hollow glass microspheres and the hollow glass vacuum microspheres can also have a low emissivity highly reflective metal coating deposited on the inner wall surface of the microsphere which effectively reflects light and radiant heat energy and avoids the wear and deterioration that occurs by utilizing an outer coating of a reflective metal caused by point to point contact of the microspheres with adjacent spheres and/or chemical degradation due to chemical agents in the surrounding atmosphere.

The process and apparatus of the present invention provide a practical and economical means by which hollow glass microspheres having a high heat insulation efficiency can be utilized to prepare a relatively low cost efficient insulating material for every day uses.

The process and apparatus of the present invention for the first time provide a practical and economical means by which the high heat insulation efficiency of a vacuum can be utilized to prepare a relatively low cost highly efficient insulating material for common every day uses. The present invention also allows the economical production of hollow glass microspheres from a low or high melting temperature glass composition which incorporates a radiation barrier and can be used as an insulating material. The apparatus and process of the present invention provide for the production of hollow glass microspheres at economic prices and in large quantities. The process and apparatus of the present invention also provide for the production of hollow glass vacuum microspheres at economic prices and in large quantities.

The process and apparatus of the present invention, as compared to the prior art processes of using a latent liquid or solid blowing agent, can be conducted at higher temperatures since there is no included expandable and/or decompsable blowing agent used. The ability to use higher blowing temperatures results in for particular glass compositions a lower glass viscosity which allows surface tension forces to produce significantly greater uniformity in wall thickness, sphericity and diameter of the microspheres produced.

The process and apparatus of the present invention allow the use of a wide variety of blowing gases and blowing gas materials to be used and encapsulated.

The present invention provides a method for using a metal vapor blowing gas to blow hollow glass microspheres to obtain a high contained vacuum within the microsphere. The present invention also allows for the addition to metal vapor blowing gas small amounts of selected metal vapors, e.g. alkali metal vapors, to getter, i.e. react with trace gases that may evolve from the molten glass film as the microsphere is being formed. The selected metal vapors getter any evolved gases and maintain the high contained vacuum.

The process and apparatus of the present invention allows the production of hollow glass microspheres for insulation and/or filler uses having predetermined diameters, wall thicknesses, strength and resistance to chemical agents and weathering and gas permeability such that superior systems can be designed, manufactured and tailor made to suit a particular desired use. In addition, the surface of the hollow glass microspheres, because of the method by which they are made, do not have, i.e. are free of sealing tips.

The hollow glass microspheres and hollow glass vacuum microspheres of the present invention can be used in the design and construction of superior insulating systems for use in combination with solar energy collectors such that the solar energy collectors can be efficiently operated at outside temperatures below 32° F. and can be operated at heat exchange medium outlet temperatures above 160° F. such that they operate efficiently in the winter and in the summer they can be used to supply summer air-conditioning needs.

BRIEF DESCRIPTION OF THE DRAWINGS

The attached drawings illustrate exemplary forms of the method and apparatus of the present invention for making microspheres for use in and as insulating materials and/or for use in and as filler materials.

FIG. 8 of the drawings illustrates in graphic form the relationship between the thickness of the thin metal film deposited on the inner wall surface of the hollow microsphere, the metal vapor blowing gas pressure and the diameter of the microspheres.

DETAILED DISCUSSION OF THE DRAWINGS

The invention will be described with reference to the accompanying Figures of the drawings wherein like numbers designate like parts throughout the several views.

Figure 1:
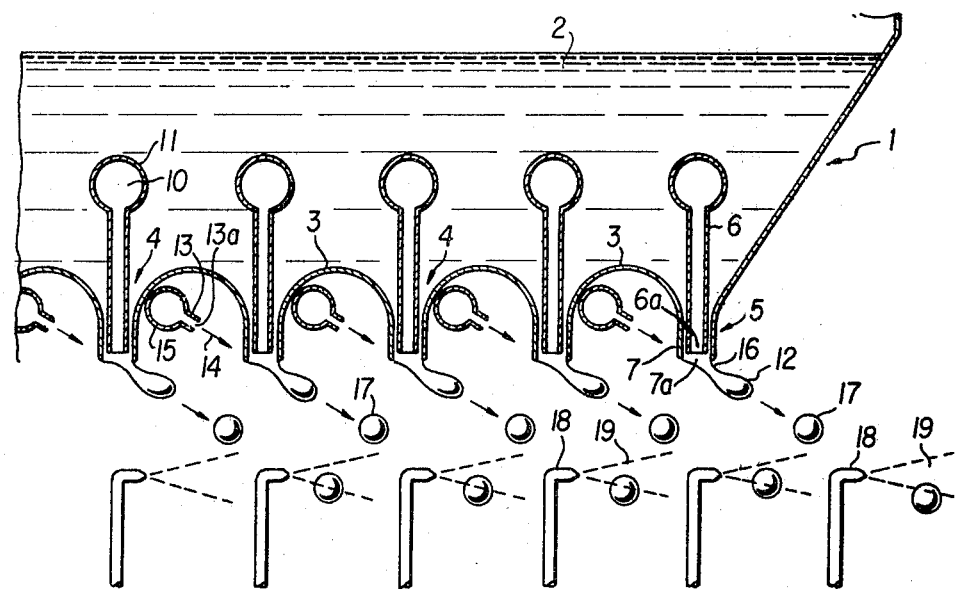
FIG. 1 of the drawings shows in cross-section an apparatus having multiple coaxial blowing nozzle means for supplying the gaseous material for blowing hollow glass microspheres, a transverse jet providing an entraining fluid to assist in the formation and detachment of the microspheres from the blowing nozzles, and means for supplying a quench fluid to cool the microspheres.
Figure 2:
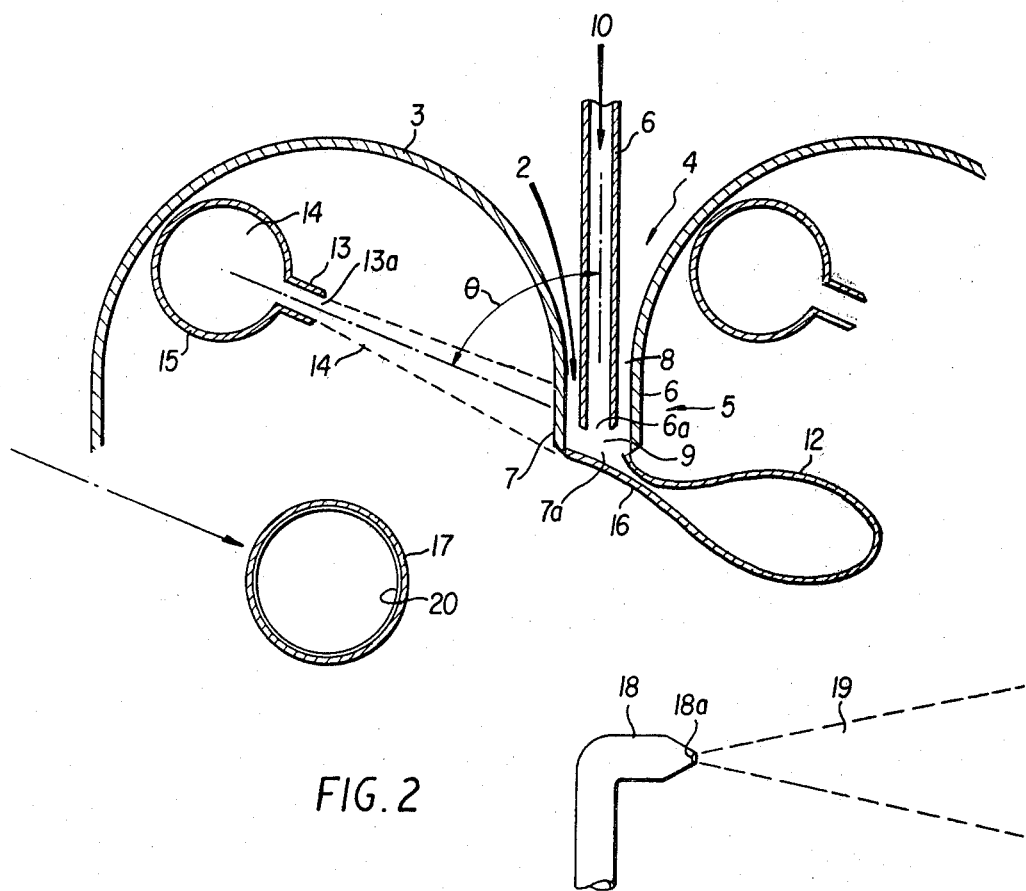
FIG. 2 of the drawings is an enlarged detailed cross-section of the nozzle means of apparatus shown in FIG. 1.

Referring to FIGS. 1 and 2 of the drawings, there is illustrated a vessel 1, made of suitable refractory material and heated by means not shown for holding molten glass 2. The bottom floor 3 of vessel 1 contains a plurality of openings 4 through which molten glass 2 is fed to coaxial blowing nozzles 5. The coaxial blowing nozzle 5 can be made separately or can be formed by a downward extension of the bottom 3 of vessel 1. The coaxial blowing nozzle 5 consists of an inner nozzle 6 having an orifice 6a for a blowing gas, an inert blowing gas or metal vapor blowing gas and an outer nozzle 7 having an orifice 7a for molten glass. The inner nozzle 6 is disposed within and coaxial to outer nozzle 7 to form annular space 8 between nozzles 6 and 7, which annular space provides a flow path for molten glass 2. The orifice 6a of inner nozzle 6 terminates at or a short distance above the plane of orifice 7a of outer nozzle 7.

The molten glass 2 at about atmospheric pressure or at elevated pressure flows downwardly through annular space 8 and fills the area between orifice 6a and 7a. The surface tension forces in molten glass 2 form a thin liquid molten glass film 9 across orifice 6a and 7a.

A blowing gas 10, inert blowing gas, metal vapor blowing gas and/or a blowing gas containing dispersed metal particles, which is heated by means not shown to about the temperature of the molten glass and which is at a pressure above the molten glass pressure at the blowing nozzle, is fed through distribution conduit 11 and inner coaxial nozzle 6 and brought into contact with the inner surface of molten glass film 9. The blowing gas or metal vapor exerts a positive pressure on the molten glass film to blow and distend the film outwardly to form an elongated cylinder shaped liquid film 12 of molten glass filled with the blowing gas or metal vapor 10. The elongated cylinder 12 is closed at its outer end and is connected at its inner end to outer nozzle 7 at the peripheral edge of orifice 7a. A balancing pressure of a gas or of an inert gas, i.e. a slightly lower pressure, is provided in the area of the blowing nozzle into which the elongated cylinder shaped liquid film is blown. The illustrated coaxial nozzle can be used to produce microspheres having diameters three to five times the size of the inside diameter of orifice 7a and is useful in blowing low viscosity glass materials.

A transverse jet 13 is used to direct an inert entraining fluid 14, which is heated to about, below or above the temperature of the molten glass 2, by means not shown. The entraining fluid 14 is fed through distribution conduit 15, nozzle 13 and transverse jet nozzle orifice 13a and directed at the coaxial blowing nozzle 5. The transverse jet 13 is aligned to direct the flow of entraining fluid 14 over and around blowing nozzle 7 in the microsphere forming region at and behind the orifice 7a. The entraining fluid 14 as it passes over and around blowing nozzle 5 fluid dynamically induces a pulsating or fluctuating pressure field in the entraining fluid 14 at the opposite or lee side of blowing nozzle 5 in its wake or shadow.

The entraining fluid 14 envelops and acts on the elongated cylinder 12 in such a manner as to cause the cylinder to flap, fold, pinch and close-off at its inner end at a point 16 proximate to the orifice 7a of outer nozzle 7. The continued movement of the entraining fluid 14 over the elongated cylinder 12 produces fluid drag forces on the cylinder 12 and detaches it from the orifice 7a of the outer nozzle 7 to allow the cylinder to fall, i.e. be entrained and transported away from nozzle 7. The surface tension forces of the molten glass act on the entrained, falling elongated cylinder 12 and cause the cylinder to seek a minimum surface area and to form a spherical shape hollow molten glass microsphere 17.

Quench nozzles 18 having orifices 18a are disposed below and on both sides of coaxial blowing nozzle 5 and direct cooling fluid 19 at and into contact with the molten glass microsphere 17 to rapidly cool and solidify the molten glass and form a hard, smooth hollow glass microsphere. The quench fluid 19 also serves to carry the hollow glass microsphere away from the coaxial blowing nozzle 5. Where a metal vapor is used as a blowing gas to blow the microspheres, the quench fluid cools and condenses the metal vapor to deposit the metal vapor on the inner wall surface of the microsphere as a transparent or reflective thin metal coating 20. Additional cooling time, if necessary, can be provided by using a fluidized bed, liquid carrier or belt carrier system for the hollow glass microspheres to harden the microspheres with substantially little or no distortion or effect on the size or shape of the microspheres. The cooled and solidified hollow glass microspheres are collected by suitable means not shown.

Figures 3, 4:
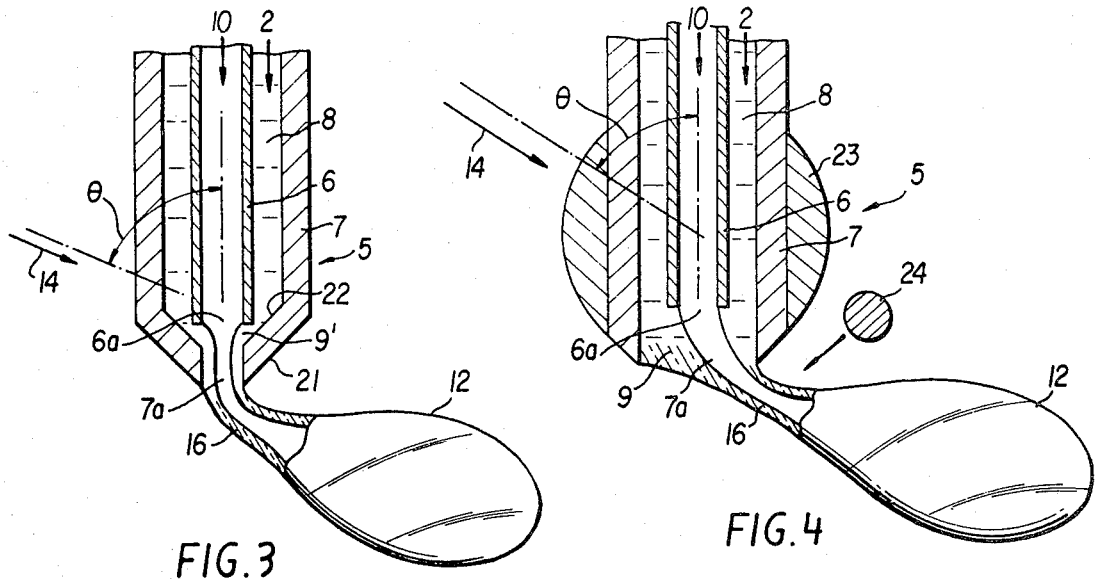
FIG. 3 of the drawings is a detailed cross-section of a modified form of the nozzle means shown in FIG. 2 in which the lower end of the nozzle means is tapered inwardly.
FIG. 4 of the drawings is a detailed cross-section of a modified form of the nozzle means shown in FIG. 2 in which the lower portion of the nozzle is enlarged.

The FIG. 3 of the drawings illustrates a preferred embodiment of the invention in which the lower portion of the outer coaxial nozzle 7 is tapered downwardly and inwardly at 21. This embodiment as in the previous embodiment comprises coaxial blowing nozzle 5 which consists of inner nozzle 6 with orifice 6a and outer nozzle 7 with orifice 7a'. The figure of the drawings also shows elongated cylinder shaped liquid film 12 with a pinched portion 16.

The use of the tapered nozzle 21 construction was found to substantially assist in the formation of a thin molten glass film 9' in the area between orifice 6a of inner nozzle 6 and orifice 7a' of outer nozzle 7. The inner wall surface 22 of the taper portion 21 of the outer nozzle 7 when pressure is applied to molten glass 2 forces the molten glass 2 to squeeze through a fine gap formed between the outer edge of orifice 6a, i.e. the outer edge of inner nozzle 6, and the inner surface 22 to form the thin molten glass film 9' across orifice 6a and 7a'. Thus, the formation of the molten film 9' does not in this embodiment rely solely on the surface tension properties or the molten glass. The illustrated coaxial nozzle can be used to produce microspheres having diameters three to five times the size of the diameter of orifice 7a of coaxial nozzle 7 and allows making microspheres of smaller diameter than those made using the FIG. 2 apparatus and is particularly useful in blowing high viscosity glass materials.

The diameter of the microsphere is determined by the diameter of orifice 7a'. This apparatus allows the use of larger inner diameters of outer nozzle 7 and larger inner diameters of inner nozzle 6, both of which reduce the possibility of plugging of the coaxial nozzles when in use. These features are particularly advantageous when the blowing gas contains dispersed metal particles and/or the glass compositions contain additive material particles.

Figures 3A, 3B, 3C:
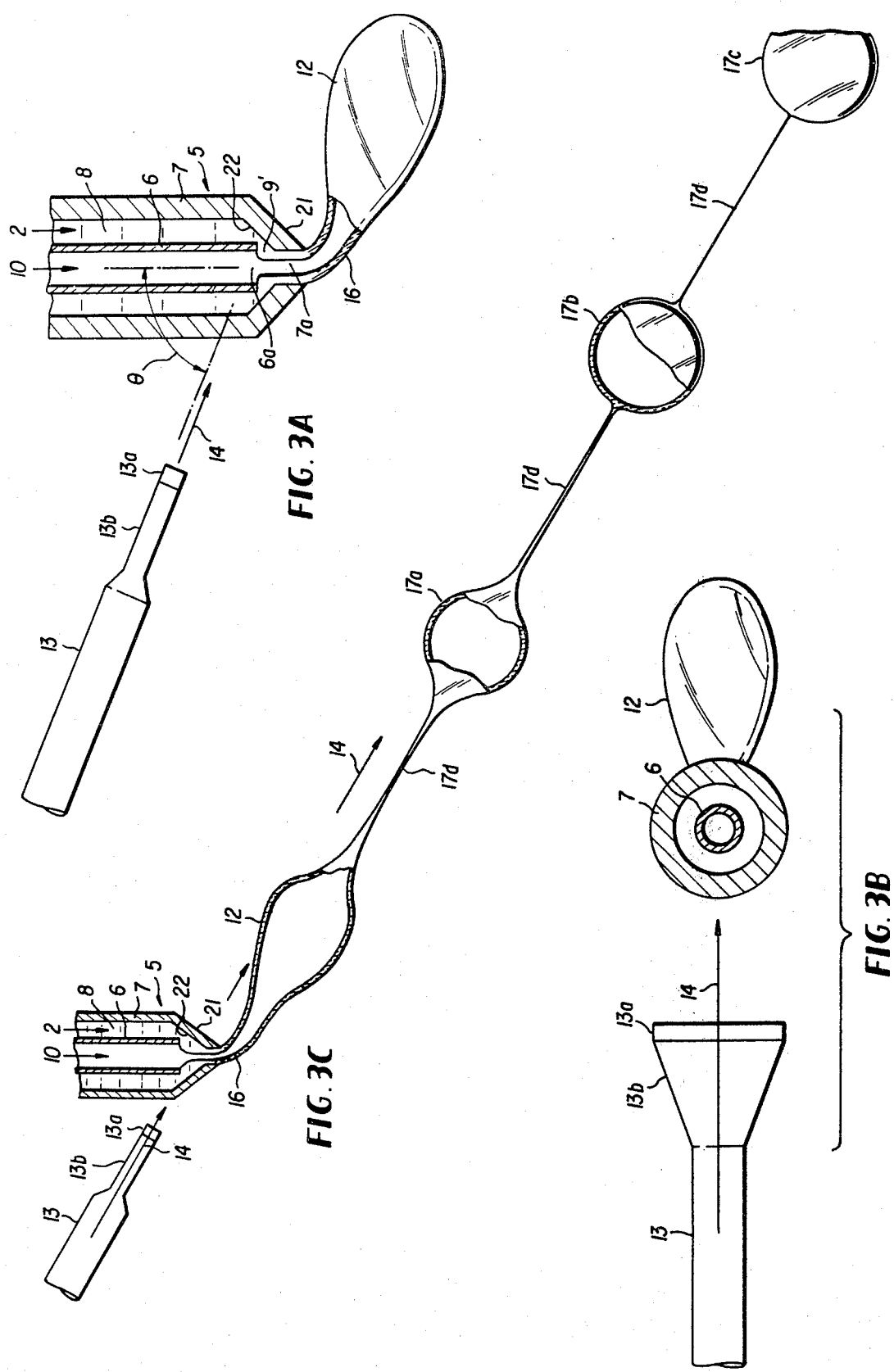
FIG. 3a of the drawings is a detailed cross-section of a modified transverse jet entraining means having a flattened orifice opening and the FIG. 3 nozzle means.
FIG. 3b of the drawings is a top plane view of the modified transverse jet entraining means and the nozzle means illustrated in FIG. 3a of the drawings.
FIG. 3c of the drawings illustrates the use of the apparatus of FIG. 3b to make filamented hollow glass microspheres.

The FIGS. 3a and 3b of the drawings illustrate another preferred embodiment of the invention in which the outer portion of the transverse jet 13 is flattened to form a generally rectangular or oval shaped orifice opening 13a. The orifice opening 13a can be disposed at an angle relative to a line drawn through the central axis of coaxial nozzle 5. The preferred angle, however, is that as illustrated in the drawing. That is, at an angle of about 90° to the central axis of the coaxial nozzle 5.

The use of the flattened transverse jet entraining fluid was found, at a given velocity, to concentrate the effect of the fluctuating pressure field and to increase the amplitude of the pressure fluctuations induced in the region of the formation of the hollow microspheres at the opposite or lee side of the blowing nozzle 5. By the use of the flattened transverse jet and increasing the amplitude of the pressure fluctuations, the pinching action exerted on the cylinder 12 is increased. This action facilitates the closing off of the cylinder 12 at its inner pinched end 16 and detaching of the cylinder 13 from the orifice 7a of the center nozzle 7.

The FIG. 3c of the drawings illustrates another preferred embodiment of the present invention in which a high viscosity glass material is used to blow hollow glass filamented microspheres. In this Figure, the elongated shaped cylinder 12 and glass microspheres 17a, 17b and 17c are connected to each other by thin glass filaments 17d. As can be seen in the drawing, as the microspheres 17a, 17b and 17c progress away from blowing nozzle 5 surface tension forces act on the elongated cylinder 12 to effect the gradual change of the elongated shaped cylinder 12 to the generally spherical shape 17a, more spherical shape 17b and finally the spherical shape microsphere 17c. The same surface tension forces cause a gradual reduction in the diameter of the connecting filaments 17d, as the distance between the microspheres and filaments and the blowing nozzle 5 increases. The hollow glass microspheres 17a, 17b and 17c that are obtained are connected by thin filament portions 17d that are substantially of equal length and that are continuous with the glass microsphere.

The operation of the apparatus illustrated in FIGS. 3, 3a, 3b and 3c is similar to that discussed above with regard to FIGS. 1 and 2 of the drawings.

The FIG. 4 of the drawings illustrates an embodiment of the invention in which the lower portion of the coaxial nozzle 7 is provided with a bulbous member 23 which imparts to the outer nozzle 7 a spherical shape. This embodiment as in the previous embodiments comprises coaxial blowing nozzle 5 which consists of inner nozzle 6 with orifice 6a and outer nozzle 7 with orifice 7a. The figure of the drawings also shows elongated cylinder shaped liquid film 12 with the pinched portion 16.

The use of the bulbous spherical shaped member 23 was found for a given velocity of entraining fluid 14 (FIG. 2) to substantially increase the amplitude of the pressure fluctuations induced in the region of the formation of the hollow microspheres at the opposite or lee side of the blowing nozzle 5. By the use of the bulbous member 23 and increasing the amplitude of the pressure fluctuations, the pinching action exerted on the elongated cylinder 12 is increased. This action facilitates the closing off of the cylinder 12 at its inner pinched end 16 and detaching the cylinder 12 from the orifice 7a of the outer nozzle 7.

In still another embodiment of the invention which is also illustrated in FIG. 4 of the drawings, a beater bar 24 can be used to assist in detaching the cylinder 12 from orifice 7a. The beater bar 24 is attached to a spindle, not shown, which is caused to rotate in a manner such that the beater bar 24 is brought to bear upon the pinched portion 16 of the elongated cylinder 12 and to thus facilitate the closing off of the cylinder 12 at its inner pinched end 16 and detaching the cylinder 12 from the orifice 7a of outer nozzle 7.

The operation of the apparatus illustrated is otherwise similar to that disclosed above with regard to FIGS. 1, 2, 3 and 4.

The embodiments of the invention illustrated in the FIGS. 2 to 4 can be used singly or in various combinations as the situation may require. The entire apparatus can be enclosed in a high pressure containment vessel, not shown, which allows the process to be carried out at elevated pressures.

Figure 5:
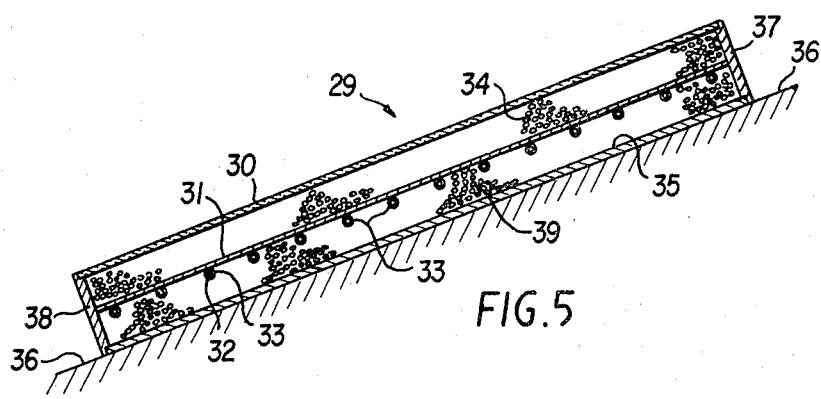
FIG. 5 of the drawings shows a cross-section of an end view of a flat plate solar energy collector using the hollow glass microspheres of the present invention.

The FIG. 5 of the drawings illustrates the use of the hollow glass microspheres of the present invention in the construction of a flat plate solar energy collector 29. The drawing shows a cross-section taken from an end view of the solar collector. The outer cover member 30 protects the solar collector from the weather elements. The cover member 30 can be made from clear glass or plastic. The cover member 30 can also be made from several layers of transparent hollow glass vacuum microspheres of this invention bonded together with a transparent polyester, polyolefin, polyacrylate or polymethyl acrylate resin to form a transparent cover. There is disposed below and parallel to cover 30 a black coated flat metal plate absorber 30 to which there is bonded to the bottom surface thereof a multiplicity of evenly spaced heat exchange medium 32 containing tubes 33. The heat exchange medium can, for example, be water and the tubes 33 are interconnected by conventional means not shown to allow for the flow of the heat exchange medium 32 through the tubes 33. In order to minimize heat loss from the solar collector and increase its efficiency, the space between the outer cover 30 and the flat plate absorber 31 can be filled with a bed of transparent hollow glass vacuum microspheres 34 of the present invention. The solar collector 29 has an inner cover member 35 by means of which the collector can be attached to a roof 36 of a home. To further decrease the heat loss of the solar collector and increase its efficiency, the space between the lower surface of the flat plate absorber 31 and the inner cover member 35 can be filled with reflective hollow glass vacuum microspheres 39 containing on the inner surface thereof a highly reflective metal coating. The end members 37 and 38 of the solar collector 29 close-off the top and bottom edges of the collector.

The construction and operation of the flat plate solar collector are otherwise essentially the same as the known flat plate solar collectors.

Figure 6:
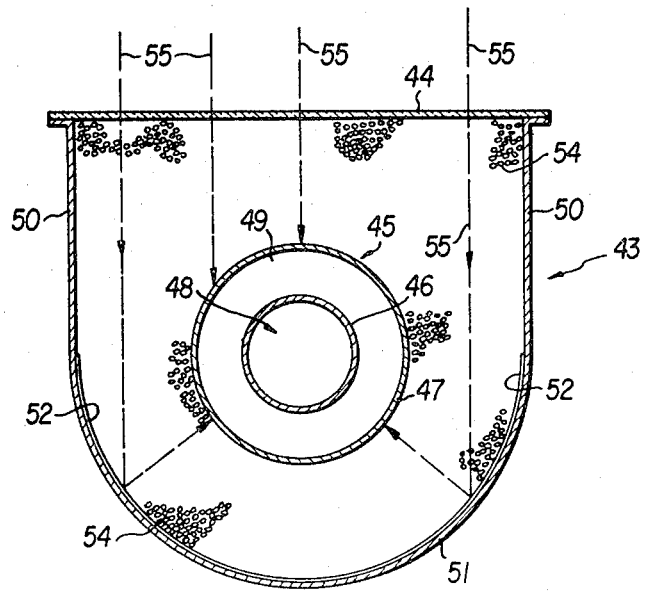
FIG. 6 of the drawings shows a cross-section of an end view of a tubular solar energy collector using the hollow glass microspheres of the present invention.

The FIG. 6 of the drawings illustrates the use of the hollow glass microspheres of the present invention in the construction of a tubular solar energy collector 43. The drawing shows a cross-section taken from an end view of the solar collector. The outer cover member 44 can be made from clear glass or plastic. The cover member 44 can also be made from several layers of light transparent hollow glass vacuum microspheres of this invention bonded together with a transparent polyester or polyolefin resin to form a transparent cover. There is disposed below and parallel to cover 30 a double pipe tubular member 45. The tubular member 45 consists of an inner feed tube 46 and an outer return tube 47. The heat exchange medium 48, for example water, is fed through inner feed tube 46, passes to one end of the tube where it reverses its direction of flow, by means not shown, and the heat exchange medium 49 (return) passes back through the return tube 47. The inner feed tube 46 is coaxial to the outer return tube 47. The outer return tube 47 has on its surface a black heat absorbing coating. The heat exchange medium in passing through feed tube 46 and return tube 47 is heated.

The tubular collector 43 has outer parallel side covers 50 and a lower outer curved cover portion 51. The lower curved cover portion 51 is concentric with the inner tube 46 and outer tube 47. The inner surface of the lower portion 51 is coated with a reflecting material 52 such that the sun's rays are reflected and concentrated in the direction of the black heat absorbing surface coating of return tube 47. In order to minimize heat loss from the solar collector and increase its efficiency, the entire area between the outer covers 44, 50 and 51 and the return tube 47 can be filled with a bed of the light transparent hollow glass vacuum microspheres 54 of the present invention.

The tubular solar collector 43 is normally mounted in groups in a manner such that they intercept the movement of the sun across the sky. The sun's rays pass through the transparent microspheres 54 and impinged directly on the outer side of the return tube 47 and are reflected by reflector 52 and impinged on the lower inner side of return tube 47.

The construction and operation of the tubular solar collector are otherwise essentially the same as the known tubular solar collectors.

Figure 7:
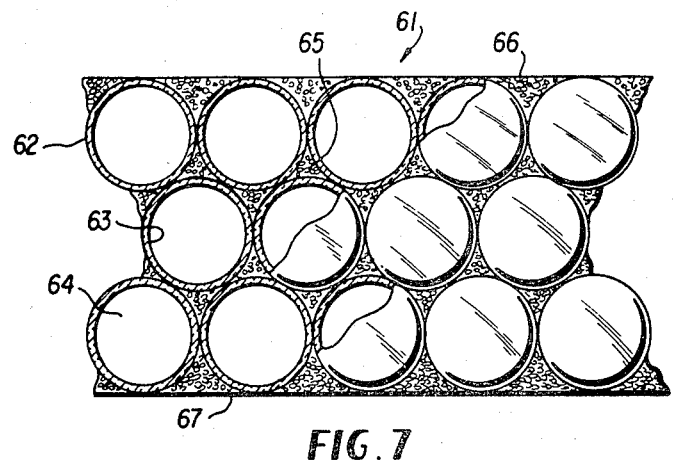
FIG. 7 of the drawings shows a cross-section of spherical shaped hollow glass microspheres made into a formed insulation panel.

The FIG. 7 of the drawings illustrates the use of the hollow glass microspheres of the present invention in the construction of a formed panel 61. The panel contains multiple layers of uniform sized glass microspheres 62. The microspheres can have a thin deposited layer 63 of a reflecting metal deposited on their inner wall surface. The internal volume of the microspheres can contain a high vacuum or can be filled with a low heat conductivity gas 64 and the interstices 65 between the microspheres can be filled with the same gas or a low heat conductivity foam containing a low heat conductivity gas. The facing surface 66 can be coated with a thin layer of plaster suitable for subsequent sizing and painting and/or covering with wall paper. The backing surface 67 can be coated with the same or different plastic to form a vapor barrier or with plaster or with both materials.

Figure 7A:
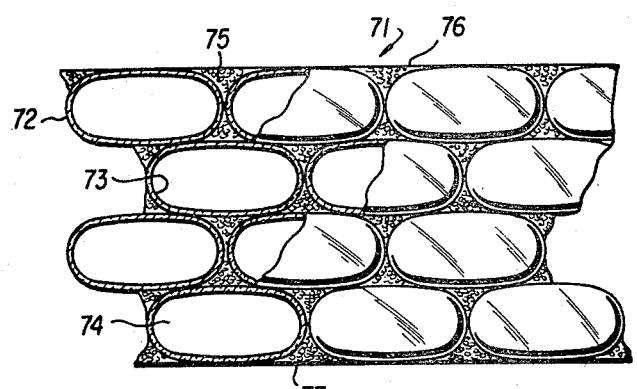
FIG. 7a of the drawings shows a cross-section of oblate spheroid shaped hollow glass microspheres made into a formed insulation panel.

The FIG. 7a of the drawings illustrates the use of the hollow glass microspheres of the present invention in the construction of a formed panel 71. The panel contains multiple layers of uniform sized flattened oblate spheroid shaped microspheres 72. The oblate spheroid shaped microspheres can have an inner thin deposited layer 73 of a reflective metal. The internal volume of the microsphere can contain a high vacuum or can be filled with a low heat conductivity gas 74. The flattened configuration of the microspheres substantially reduces the volume of the interstices between the microspheres which can be filled with a low heat conductivity foam 75 containing a low heat conductivity gas. The facing 76 can be coated with a thin layer of plaster suitable for subsequent sizing and painting and/or covering with wall paper. The backing surface 77 can be coated with a suitable plastic to form a vapor barrier or with plaster or with both materials.

Figure 7B:
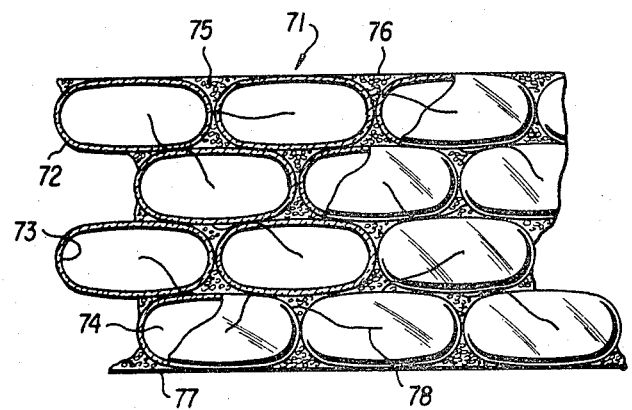
FIG. 7b of the drawings shows a cross-section of oblate spheroid shaped hollow glass filamented microspheres made into a formed insulation panel in which the filaments interrupt the microsphere wall to wall contact.

The FIG. 7b of the drawings illustrates an embodiment of the formed wall panel of FIG. 7a in which filamented hollow glass microspheres connected by very thin glass filaments 78 are used. The thin glass filaments 78 are formed between adjacent microspheres when and as the microspheres are blown and join the microspheres together by continuous glass material. The connecting filaments 78 in the formed panel interrupt the wall to wall contact between the microspheres and serve to substantially reduce the conduction heat transfer between adjacent microspheres. The use of filamented microspheres to provide the interrupting filaments is particularly advantageous and preferred because the filaments are positively evenly distributed, cannot settle, are supplied in the desired controlled amount, and in the formed panel provide an interlocking structure which serves to strengthen the formed panel. The facing 76, as before, can be coated with a thin layer of plaster suitable for subsequent sizing and painting and/or covering with wall paper. The backing surface 77 can be coated with a suitable plastic to form a vapor barrier or with plaster or with both materials.

The FIG. 8 of the drawings illustrates in graphic form the relationship between the thickness of the thin metal film deposited on the inner wall surface of the hollow microsphere, the metal vapor blowing gas pressure and the inner diameter of the microspheres. A preferred metal vapor blowing gas is zinc vapor.

INORGANIC FILM FORMING MATERIAL AND GLASS COMPOSITIONS

The inorganic film forming material and compositions and particularly the glass compositions from which the hollow glass microspheres of the present invention are made can be widely varied to obtain the desired physical characteristics for heating, blowing, forming, cooling and hardening the microspheres and the desired heat insulating, strength, gas permeability and light transmission characteristics of the glass microspheres produced.

The glass compositions can be selected to have a low heat conductivity and sufficient strength when cooled and solidified to, when the microsphere contains a high vacuum, withstand atmospheric pressure. The molten glass composition forms hard microspheres which are capable of contacting adjacent microspheres without significant wear or deterioration at the points of contact and are resistant to deterioration from exposure to moisture, heat and/or weathering.

The constituents of the glass compositions can vary widely, depending on their intended use, and can include naturally occurring and synthetically produced glass materials.

The constituents of the glass compositions can be selected and blended to have high resistance to corrosive gaseous materials, high resistance to gaseous chemical agents, high resistance to alkali and weather, low susceptibility to diffusion of gaseous materials into and out of the glass microspheres, and to be substantially free of trapped gas bubbles or dissolved gases in the walls of the microspheres which can form bubbles and to have sufficient strength when cured, hardened and solidified to support a substantial amount of weight and/or to withstand a substantial amount of pressure.

The microspheres of the present invention are capable of contacting adjacent microspheres without significant wear or deterioration at the points of contact and are resistant to deterioration from exposure to moisture, heat and/or weathering.

The glass compositions preferably contain relatively large amounts of silicon dioxide, alumina, lithium, zirconia, and lime and relatively small amounts of soda. Calcium can be added to assist in melting the glass and boric oxide can be added to improve the weathering properties of the glass. The glass compositions are formulated to have relatively high melting and fluid flow temperatures with a relatively narrow temperature difference between the melting i.e. fluid flow and hardening temperatures. The glass compositions are formulated such that they have a high rate of viscosity increase with decreasing temperature so that the microsphere walls will solidify, harden and strengthen before the blowing gas within the sphere decreases in volume and pressure a sufficient amount to cause the microsphere to collapse. Where it is desirous to maintain positive pressure or a high vacuum in the inner volume of the microspheres, the permeability to gases such as helium requires reduction of the network formers, such as silica, and the inclusion of network modifiers, such as alumina. Other means for decreasing the permeability of the hollow glass microspheres to gases are discussed below.

The glass compositions suitable for use in the present invention can have the range of proportions listed below in Columns A, B and C, in percent by weight.

TABLE 1

|  | A (Alumina) | B (Lithium) | C (Zirconia) |
| --- | --- | --- | --- |
| $SiO_2$ | 46–64 | 58–85 | 40–58 |
| $Al_2O_3$ | 10–22 | 0–25 | 6–12 |
| $Li_2O$ | — | 8–25 | — |
| Zirconia | — | — | 8–20 |
| CaO | 5–18 | 0–2 | 1–3 |
| MgO | 0–12 | 0–2 | 0–4 |
| $B_2O_3$ | 4–12 | 2–6 | 0–6 |
| $Na_2O$ | 0–1 | 0–1.0 | 0–2.5 |
| BaO | 0–2.0 | 0–2.0 | 0–2.0 |
| $CaF_2$ | 0–2.0 | 0–2.0 | 0–2.0 |
| $K_2O$ | 0–0.7 | 0–0.7 | 0.5–1.5 |

The compositions of Columns A and B do not contain zirconia whereas the compositions of Column C are relatively high in zirconia content.

The use of glass compositions containing a relatively high alumina content and a relatively low soda content was found to produce a rapid hardening of the glass microspheres, which facilitated the production of glass microspheres and in particular glass microspheres having a high contained vacuum.

The Table 2 below shows in Column I a high alumina content glass composition of the present invention and in Column II a high soda content glass composition heretofore used to make glass microspheres.

The glass microspheres made from the Columns I and II glass composition are made in accordance with the present invention by blowing the glass with an inert blowing gas.

TABLE 2

|  | I (Alumina) | II (Soda) |
| --- | --- | --- |
| $SiO_2$ | 57.0 | 72.2 |
| $Al_2O_3$ | 20.5 | 1.2 |
| CaO | 5.5 | 8.8 |
| MgO | 12 | 3.3 |
| $B_2O_3$ | 4 | — |
| $Na_2O$ | 1.0 | 14.2 |

The Table 3 below compares the increase in viscosity on cooling of the high alumina content (I) and the high soda content (II) glass compositions of Table 2.

TABLE 3

|  | Temperature | Viscosity-Poises |
| --- | --- | --- |
| High Alumina Comp. (I) | 2700° F. | 30 |
|  | 1830° F. | $10 \times 10^5$ |
|  | 1470° F. | $10 \times 10^{10}$ |
| High Soda Comp. (II) | 2700° F. | 100 |
|  | 1830° F. | $10 \times 10^3$ |
|  | 1470° F. | $10 \times 10^5$ |

The Table 3 shows that the high alumina content glass has a substantially faster hardening rate than the high soda content glass such that in the first 1300° F. of chilling, the high alumina content glass had a viscosity of $10 \times 10^5$ times greater than that of the high soda content glass.

For certain uses relatively low temperature melting glass compositions can be used. The low melting glass compositions can contain relatively large amounts of lead. Naturally occurring glass materials such as basaltic mineral compositions can also be used. The use of these naturally occurring glass compositions can in some cases substantially reduce the cost of the raw materials used.

Suitable lead containing glass compositions and basaltic mineral compositions are in Table 4.

TABLE 4

|  | D (Lead) | E (Basalt)* |
|---|---|---|
| $SiO_2$ | 30–70 | 40–55 |
| $Al_2O_3$ | 0–2 | 13–17 |
| Pb | 10–60 | — |
| $Fe_2O_3$ | — | 2–16 |
| FeO | — | 1–12 |
| CaO | 0–5 | 7–14 |
| MgO | 0–3 | 4–12 |
| $Na_2O$ | 0–9 | 2–4 |
| $K_2O$ | 0–9 | 1–2 |
| $H_2O$ | — | 0.5–4 |
| $TiO_2$ | — | 0.5–4 |

*See G.L. Sheldon, Forming Fibres from Basalt Rock, Platinum Metals Review, pages 18 to 34, 1978.

The discussions in the present application with respect to glass compositions is applicable to the various glass compositions mentioned including the naturally occurring basaltic mineral compositions.

There may be added to the glass compositions chemical agents which effect the viscosity of the compositions in order to obtain the desired viscosities for blowing the microspheres.

To assist in the blowing and formation of the glass microspheres and the glass vacuum microspheres and to control the surface tension and viscosity of the spheres suitable surface active agents, such as colloidal particles of insoluble substances and viscosity stabilizers can be added to the glass composition as additives.

A distinct and advantageous feature of the present invention is that latent solid or latent liquid blowing gases are not used or required and that the microspheres that are produced are free of latent solid or latent liquid blowing gas materials or gases.

The glass compositions from which the hollow glass microspheres can be made are, depending on the particular glass materials used, to some degree permeable to the gas materials used to blow the microspheres and/or to the gases present in the medium surrounding the microspheres. The gas permeability of the glass compositions can be controlled, modified and/or reduced or substantially eliminated by the addition, prior to blowing the microspheres, to the glass composition of very small inert laminar plane-orientable additive material particles. When any one or more of these laminar plane-orientable additive material particles are added to a glass composition prior to the blowing and formation of the hollow glass microsphere, the process of making the microsphere aligns the laminar particles, as the glass film is stretched in passing, i.e. extruded, through the conical blowing nozzle, with the walls of the hollow glass microsphere and normal to the gas diffusion direction. The presence of the laminar plane particles in the microsphere walls substantially diminishes the gas permeability of the glass film. The sizes of the additive particles are advantageously selected to be less than one-half the thickness of the wall of the microspheres.

BLOWING GAS

The hollow microspheres and particularly the glass microspheres can be blown with a gas, an inert gas, an inert metal vapor or gas containing dispersed metal particles or mixtures thereof. The microspheres can be used to make insulating materials and/or filler materials.

The inert gases used to blow the microspheres are selected to have a low heat conductivity and generally involve heavy molecules which do not transfer heat readily. Suitable blowing gases are argon, xenon, carbon dioxide, nitrogen, nitrogen dioxide, sulfur and sulfur dioxide. Organo metal compounds can also be used as a blowing gas. The blowing gas is selected to have the desired internal pressure when cooled to ambient temperatures. When sulfur, for example, is used as a blowing gas, the sulfur condenses and a partial vacuum can be formed in the microsphere.

Blowing gases can also be selected that react with the inorganic film forming material or composition, e.g. the glass microspheres, for example, to assist in the hardening of the microspheres or to make the microsphere less permeable to the contained blowing gases. The blowing gases can also be selected to react with the deposited thin metal layer to obtain desired characteristics in the metal layer. For example, to reduce the thermal conductivity of the metal layer. For certain uses, oxygen or air can be used as or added to the blowing gas.

The metal vapor is used as a blowing gas to obtain a substantial vacuum in the contained volume of the microsphere and to deposit a thin metal coating on the inner wall surface of the hollow glass microsphere. The specific metal used as well as the thickness and nature of metal coating deposited will determine whether the metal coating is transparent or reflective of visible light.

The metal vapor used to blow the hollow glass microspheres is selected to have the desired vaporization temperature, latent heat capacity and vapor pressure at the blowing temperature, and to have the desired vapor pressure at the solidification temperature and ambient temperature. The condensing and depositing of the metal vapor within the hollow glass microsphere produces a vapor pressure equivalent to the vapor pressure of the metal at room temperature, i.e. about zero vapor pressure. The thickness of the deposited metal coating will depend to some extent upon the metal vapor pressure used to blow the microsphere, the size of the microsphere and the temperature of the molten glass.

Small amounts of metal vapors, e.g. alkali metals, that act as gettering materials can be added to the metal vapor blowing gas. The gettering materials react with gases evolved from the molten glass film during the formation of the microspheres and maintain the hard contained vacuum.

The metal vapor blowing gases such as zinc, antimony, barium, cadmium, cesium, bismuth, selenium, lithium, magnesium, and potassium can be used. Zinc and selenium, however, are preferred and zinc is particularly preferred.

An auxilliary blowing gas, e.g. an inert blowing gas can advantageously be used in combination with a metal vapor blowing gas to assist in the control of the cooling and solidification of the hollow molten glass microsphere. The auxilliary blowing gas accomplishes this purpose by maintaining the partial pressure of the auxilliary blowing gas in the microspheres for a sufficient period of time to allow the molten glass microsphere to solidify, harden and strengthen while the metal vapor is being condensed and the metal vapor pressure is substantially reduced. That is, the pressure drop of the blowing gas is slowed and a slightly lower vacuum is formed in the microsphere.

A blowing gas containing dispersed metal particles can be used to obtain in the contained volume of the microsphere a deposit of a thin metal coating on the inner wall surface of the hollow glass microsphere. The thickness of metal coating deposited will determine whether the metal coating is transparent or reflective of visible light.

The metal used to coat the inner wall surface of the hollow glass microspheres is selected to have the desired emissivity, low heat conduction characteristics, and to adhere to the inner wall surface of the glass microspheres. The thickness of the deposited metal coating will depend to some extent upon the metal, the particle size of the metal used, the size of the microspheres and the amount of dispersed metal particles used.

The dispersed metal particle size can be 25 Å to 10,000 Å, preferably 50 Å to 5,000 Å amd more preferable 100 Å to 1,000 Å. A sufficient amount of the metal is dispersed in the blowing gas to obtain the desired thickness of the deposited metal. The dispersed metal particles can advantageously be provided with an electrostatic charge to assist in depositing them on the inner wall surface of the microspheres.

Metal particles such as aluminum, silver, nickel, zinc, antimony, barium, cadmium, cesium, bismuth, selenium, lithium, magnesium, potassium, and gold can be used. Aluminum, zinc and nickel, however, are preferred. Dispersed metal oxide particles can in a similar manner be used to obtain similar articles to that of the metals. In addition, the metal oxide particles can be used to produce a deposited film of lower heat conductivity characteristics.

The thin metal coating can also be deposited on the inner wall surface of the microsphere by using as or with blowing gas organo metal compounds that are gases at the blowing temperatures. Of the organo metal compounds available, the organo carbonyl compounds are preferred. Suitable organo metal carbonyl compounds are nickel and iron.

The organo metal compounds can be decomposed by heating just prior to blowing the microspheres to obtain finely dispersed metal particles and a decomposition gas. The decomposition gas, if present, can be used to assist in blowing the microspheres. The dispersed metal particles from decomposition of the organo metal compound, as before, deposit to form the thin metal layer. Alternatively, the microsphere, after being formed and containing the gaseous organo metal compound blowing gas, can be subjected to an "electric discharge" means which decomposes the organo metal compound to form the finely dispersed metal particles and the decomposition gas.

The thickness of the deposited metal layer will depend primarily on the partial pressure of the gaseous organo metal blowing gas and the inside diameter of the microsphere.

An auxiliary blowing gas can be used to dilute the gaseous organo metal compound blowing gas in order to control the thickness of the deposited metal layer. There can also be used as an auxiliary blowing gas, a gas that acts as a catalyst for the decomposition of the organo metal compound or as a hardening agent for the glass compositions. The addition of the catalyst or hardening agent to the blowing gas prevents contact of the catalyst with the organo metal compound or the hardening agent with the glass composition until a time just before the microsphere is formed.

The entraining fluid can be a gas at a high or low temperature and can be selected to react with or be inert to the glass composition. The entraining fluid, e.g. an inert entraining fluid, can be a high temperature gas. Suitable entraining fluids are nitrogen, air, steam and argon.

An important feature of the present invention is the use of the transverse jet to direct the inert entraining fluid over and around the coaxial blowing nozzle. The entraining fluid assists in the formation and detaching of the hollow molten glass microsphere from the coaxial blowing nozzle.

The quench fluid can be a liquid, a liquid dispersion or a gas. Suitable quench fluids are steam, a fine water spray, air, nitrogen or mixtures thereof.

The inert quench fluid can be ethylene glycol vapor or liquid, steam, a fine water spray, or mixtures thereof. The hollow molten glass microspheres immediately after they are formed are rapidly quenched and cooled to solidify, harden and strengthen the glass microspheres before the internal gas pressure is reduced to such a low value that the microsphere collapses. The selection of a specific quench fluid and quench temperature depends to some extent on the glass composition from which the microsphere was formed and on the blowing gas or metal vapor used to blow the microsphere and on the metal and nature of the deposited metal film desired.

PROCESS CONDITIONS

The inorganic film forming materials and/or compositions of the present invention are heated to a temperature of about 1800° to 3100° F. and maintained in a liquid, fluid form at the desired blowing temperature during the blowing operation. The glass composition is heated to a temperature of 2000° to 2800° F., preferably 2300° to 2750° F. and more preferably 2400° to 2700° F., depending on the constituents of the composition. The lead containing glass compositions can be heated to a temperature of, for example, about 1800° to 2900° F. The basaltic mineral glass compositions can be heated to a temperature of, for example, about 2100° to 3100° F.

The glass compositions at these temperatures, i.e. the blowing temperatures, is molten, fluid and flows easily. The molten glass just prior to the blowing operation has a viscosity of 10 to 600 poises, preferably 20 to 350, and more preferably 30 to 200 poises. The molten lead containing glass compositions just prior to the blowing operation have a viscosity of, for example, 10 to 500 poises. The molten basaltic mineral glass composition just prior to the blowing operation can have a viscosity of, for example, 15 to 400 poises.

Where the process is used to make non-filamented microspheres, the liquid glass just prior to the blowing operation can have a viscosity of 10 to 200 poises, preferably 20 to 100 poises, and more preferably 25 to 75 poises.

Where the process is used to make filamented microspheres, the liquid glass just prior to the blowing operation can have a viscosity of 50 to 600 poises, preferably 100 to 400 poises, and more preferably 150 to 300 poises.

A critical feature of the present invention is that the formation of the hollow glass microspheres can be carried out at low viscosities relative to the viscosities heretofore used in the prior art processes that utilized latent liquid or solid blowing agents dispersed throughout or contained in the glass compositions used to blow the microspheres. Because of the ability to utilize comparatively low viscosities, applicant is able to obtain hollow glass microspheres, the wall of which are free of any entrapped or dissolved gases or bubbles. With the low viscosities used by applicant, any entrapped or dissolved gases diffuse out and escape from the glass film surface during the bubble formation. With the high viscosities required to be used in the prior art processes, any dissolved gases are trapped in the walls of the glass microspheres as they are formed because of the high viscosities required to be used.

The glass during the blowing operation exhibits a surface tension of 150 to 400 dynes/cm, preferably 200 to 350 dynes/cm and more preferably 250 to 325 dynes/cm.

The molten or liquid glass fed to the coaxial blowing nozzle can be at about ambient pressure or can be at an elevated pressure. The molten or liquid glass feed can be at a pressure of 1 to 20,000 p.s.i.g., usually 3 to 10,000 p.s.i.g. and more usually 5 to 5,000 p.s.i.g. The molten glass feed when used for low pressure applications can be at a pressure of 1 to 1000 p.s.i.g., preferably 3 to 500 p.s.i.g. and more preferably 5 to 100 p.s.i.g.

Where the process is used to make microspheres for use as insulating materials and in insulating systems, for use in syntactic foam systems and as filler materials in general, the liquid glass fed to the coaxial blowing nozzle can also be at a pressure of 1 to 1,000 p.s.i.g., preferably at 3 to 100 p.s.i.g., and more preferably at 5 to 50 p.s.i.g.

The molten glass is continuously fed to the coaxial blowing nozzle during the blowing operation to prevent premature breaking and detaching of the elongated cylinder shaped molten glass liquid film as it is being formed by the blowing gas.

The blowing gas, inert blowing gas, gaseous material blowing gas or metal vapor will be at about the same temperature as the molten glass being blown. The blowing gas temperature can, however, be at a higher temperature than the molten glass to assist in maintaining the fluidity of the hollow molten glass microsphere during the blowing operation or can be at a lower temperature than the molten glass to assist in the solidification and hardening of the hollow molten glass microsphere as it is formed. The pressure of the blowing gas is sufficient to blow the microsphere and will be slightly above the pressure of molten glass at the orifice 7a of the outer nozzle 7. The blowing gas pressure will also depend on and be slightly above the ambient pressure external to the blowing nozzle.

The temperatures of the blowing gases will depend on the blowing gas used and the viscosity-temperature-shear relationship for the glass materials used to make the microspheres.

The metal vapor blowing gas temperature will be sufficient to vaporize the metal and will be at about the same temperature as the molten glass being blown. The metal vapor blowing gas temperature can, however, be at a higher temperature than the molten glass to assist in maintaining the fluidity of the hollow molten glass microsphere during the blowing operation or can be at a lower temperature than the molten glass to assist in the solidification and hardening of the hollow molten glass microsphere as it is formed. The pressure of the metal vapor blowing gas is sufficient to blow the microsphere and will be slightly above the pressure of molten glass at the orifice 7a of the outer nozzle 7. The metal vapor blowing gas pressure will also depend on and be slightly above the ambient pressure external to the blowing nozzle.

The pressure of the blowing gas or gaseous material blowing gas, including the metal vapor blowing gas, is sufficient to blow the microsphere and will be slightly above the pressure of liquid glass at the orifice 7a of the outer nozzle 7. Depending on the gaseous material to be encapsulated within the hollow glass microspheres, the blowing gas or the gaseous material can be at a pressure of 1 to 20,000 p.s.i.g., usually 3 to 10,000 p.s.i.g. and more usually 5 to 5,000 p.s.i.g.

The blowing gas or gaseous material blowing gas can also be at a pressure of 1 to 1,000 p.s.i.g., preferably 3 to 500 p.s.i.g. and more preferably 5 to 100 p.s.i.g.

Where the process is used to make microspheres for use as insulating materials and in insulating systems, for use in syntactic foam systems and as filler materials in general, the blowing gas or gaseous material blowing gas can be at a pressure of 1 to 1,000 p.s.i.g., preferably at 3 to 100 p.s.i.g. and more preferably at 5 to 50 p.s.i.g.

The pressure of the blowing gas containing dispersed metal particles alone and/or in combination with the principle blowing gas is sufficient to blow the microsphere and the combined gas pressure will be slightly above the pressure of the liquid glass at the orifice 7a of the outer nozzle 7. The pressure of the combined mixture of the blowing gases will also depend on and be slightly above the ambient pressure external to the blowing nozzle.

The ambient pressure external to the blowing nozzle can be at about atmospheric pressure or can be at subatmospheric or super-atmospheric pressure. Where it is desired to have a relatively or high pressure of contained gas in the microsphere or to deposit a relatively thick coating of metal within a vacuum microsphere, the ambient pressure external to the blowing nozzle is maintained at a superatmospheric pressure. The ambient pressure external to the blowing nozzle will, in any event, be such that it substantially balances, but is slightly less than the blowing gas pressure.

The transverse jet inert entraining fluid which is directed over and around the coaxial blowing nozzle to assist in the formation and detaching of the hollow molten glass microsphere from the coaxial blowing nozzle can be at about the temperature of the molten glass being blown. The entraining fluid can, however, be at a higher temperature than the molten glass to assist in maintaining the fluidity of the hollow molten glass microsphere during the blowing operation or can be at a lower temperature than the molten glass to assist in the stabilization of the forming film and the solidification and hardening of the hollow molten glass microsphere as it is formed.

The transverse jet entraining fluid which is directed over and around the coaxial blowing nozzle to assist in the formation and detaching of the hollow liquid glass microsphere from the coaxial blowing nozzle can have a linear velocity in the region of microsphere formation of 1 to 120 ft/sec, usually 5 to 80 ft/sec and more usually 10 to 60 ft/sec.

Where the process if used to make non-filamented microspheres, the linear velocity of the transverse jet fluid in the region of microsphere formation can be 30 to 120 ft/sec, preferably 40 to 100 ft/sec and more preferably 50 to 80 ft/sec.

Where the process is used to make filamented microspheres, the linear velocity of the transverse jet fluid in the region of microsphere formation can be 1 to 50 ft/sec, preferably 5 to 40 ft/sec and more preferably 10 to 30 ft/sec.

Further, it is found (FIGS. 2 to 4) that pulsing the transverse jet entraining fluid at a rate of 2 to 1500 pulses/sec, preferably 50 to 1000 pulses/sec and more preferably 100 to 500 pulses/sec assist in controlling the diameter of the microspheres and the length of the filament portion of the filamented microspheres and detaching the microspheres from the coaxial blowing nozzle.

The distance between filamented microspheres depends to some extent on the viscosity of the glass and the linear velocity of the transverse jet entraining fluid.

the entraining fluid can be at the same temperature as the liquid glass being blown. The entraining fluid can, however, be at a higher temperature than the liquid glass to assist in maintaining the fluidity of the hollow liquid glass microsphere during the blowing operation or can be at a lower temperature than the liquid glass to assist in the stabilization of the forming film and the solidification and hardening of the hollow liquid glass microsphere as it is formed.

The quench fluid is at a temperature such that it rapidly cools the hollow molten glass microsphere to solidify, harden and strengthen the molten glass before the inner gas pressure or metal vapor pressure decreases to a value at which the glass microsphere would collapse. The quench fluid can be at a temperature of 0° to 200° F., preferably 40° to 200° F. and more preferably 50° to 100° F. depending to some extent on the glass composition.

The quench fluid very rapidly cools the outer molten glass surface of the microsphere with which it is in direct contact and more slowly cools the blowing gas or metal vapor enclosed within the microsphere because of the lower thermal conductivity of the gas or vapor. This cooling process allows sufficient time for the glass walls of the microspheres to strengthen before the gas is cooled or the metal vapor is cooled and condensed and a high vacuum formed within the glass microsphere.

The cooling and deposition of the metal vapor on the inner wall surface of the microspheres can be controlled to optimize the crystal size of the metal deposited such that sufficiently large crystals are obtained that the deposited metal film is discontinuous. The discontinuities in the metal film reduce the thermal conductivity of the metal film while at the same time retaining the metal films ability to reflect radiant heat.

The time elapsed from commencement of the blowing of the glass microspheres to the cooling and hardening of the microspheres can be 0.0001 to 1.0 second, preferably 0.0010 to 0.50 second and more preferably 0.010 to 0.10 second.

The filamented microsphere embodiment of the invention provides a means by which the microspheres may be suspended and allowed to harden and strengthen without being brought into contact with any surface. The filamented microspheres are simply drawn on a blanket or drum and are suspended between the blowing nozzle and the blanket or drum for a sufficient period of time for them to harden and strengthen.

APPARATUS

Referring to FIGS. 1 and 2 of the drawings, the refractory vessel 1 is constructed to maintain the molten glass at the desired operating temperatures. The molten glass 2 is fed to coaxial blowing nozzle 5. The coaxial blowing nozzle 5 consists of an inner nozzle 6 having an outside diameter of 0.32 to 0.010 inch, preferably 0.20 to 0.015 inch and more preferably 0.10 to 0.020 inch and an outer nozzle 7 having an inside diameter of 0.420 to 0.020 inch, preferably 0.260 to 0.025 and more preferably 0.130 to 0.030 inch. The inner nozzle 6 and outer nozzle 7 form annular space 8 which provides a flow path through which the molten glass 2 is extruded. The distance between the inner nozzle 6 and outer nozzle 7 can be 0.050 to 0.004, preferably 0.030 to 0.005 and more preferably 0.015 to 0.008 inch.

The orifice 6a of inner nozzle 6 terminates a short distance above the plane of orifice 7a of outer nozzle 7. The orifice 6a can be spaced above orifice 7a at a distance of 0.001 to 0.125 inch, preferably 0.002 to 0.050 inch and more preferably 0.003 to 0.025 inch. The molten glass 2 flows downwardly and is extruded through annular space 8 and fills the area between orifice 6a and 7a. The surface tension forces in the molten glass 2 form a thin liquid molten glass film 9 across orifice 6a and 7a which has about the same or a smaller thickness as the distance of orifice 6a is spaced above orifice 7a. The orifices 6a and 7a can be made from stainless steel, platinum alloys, or fused alumina. The surface tension forces in the liquid glass 2 form a thin liquid glass film 9 across orifices 6a and 7a which has about the same or a smaller thickness as the distance of orifice 6a is spaced above orifice 7a. The molten glass film 9 can be 25 to 3175 microns, preferably 50 to 1270 microns and more preferably 76 to 635 microns thick.

The FIG. 2 blowing nozzle can be used to blow molten glass at relatively low viscosities, for example, of 10 to 60 poises, and to blow hollow glass microspheres of relatively thick wall size, for example, of 20 to 100 microns or more.

A blowing gas, inert blowing gas, gaseous material blowing gas or metal vapor blowing gas is fed through inner coaxial nozzle 6 and brought into contact with the inner surface of molten glass film 9. The inert blowing gas exerts a positive pressure on the molten glass film to blow and distend the film outwardly and downwardly to form an elongated cylinder shaped liquid film 12 of molten glass filled with the blowing gas 10. The elongated cylinder 12 is closed at its outer end and is connected to outer nozzle 7 at the peripheral edge of orifice 7a.

The transverse jet 13 is used to direct an inert entraining fluid 14 through nozzle 13 and transverse jet nozzle orifice 13a at the coaxial blowing nozzle 5. The coaxial blowing nozzle 5 has an outer diameter of 0.52 to 0.30 inch, preferably 0.36 to 0.035 inch and more preferably 0.140 to 0.040 inch.

The process of the present invention was found to be very sensitive to the distance of the transverse jet 13 from the orifice 7a of outer nozzle 7, the angle at which the transverse jet was directed at coaxial blowing nozzle 5 and the point at which a line drawn through the center axis of transverse jet 13 intersected with a line drawn through the center axis of coaxial nozzle 5. The transverse jet 13 is aligned to direct the flow of entraining fluid 14 over and around outer nozzle 7 in the microsphere forming region of the orifice 7a. The orifice 13a of transverse jet 13 is located a distance of 0.5 to 14 times, preferably 1 to 10 times and more preferably 1.5 to 8 times and still more preferably 1.5 to 4 times the outside diameter of coaxial blowing nozzle 5 away from the point of intersect of a line drawn along the center axis of transverse jet 13 and a line drawn along the center axis of coaxial blowing nozzle 5. The center axis of transverse jet 13 is aligned at an angle of 15° to 85°, preferably 25° to 75° and more preferably 35° to 55° relative to the center axis of the coaxial blowing nozzle 5. The orifice 13a can be circular in shape and have an inside diameter of 0.32 to 0.010 inch, preferably 0.20 to 0.015 inch and more preferably 0.10 to 0.020 inch.

The line drawn through the center axis of transverse jet 13 intersects the line drawn through the center axis of coaxial blowing nozzle 5 at a point above the orifice 7a of outer nozzle 7 which is 0.5 to 4 times, preferably 1.0 to 3.5 times and more preferably 2 to 3 times the outside diameter of the coaxial blowing nozzle 5. The transverse jet entraining fluid acts on the elongated shaped cylinder 12 to flap and pinch it closed and to detach it from the orifice 7a of the outer nozzle 7 to allow the cylinder to fall free, i.e. be transported away from the outer nozzle 7 by the entraining fluid.

The transverse jet entraining fluid as it passes over and around the blowing nozzle fluid dynamically induces a periodic pulsating or fluctuating pressure field at the opposite or lee side of the blowing nozzle in the wake or shadow of the coaxial blowing nozzle. A similar periodic pulsating or fluctuating pressure field can be produced by a pulsating sonic pressure field directed at the coaxial blowing nozzle. The entraining fluid assists in the formation and detaching of the hollow glass microsphere from the coaxial blowing nozzle. The use of the transverse jet and entraining fluid in the manner described also discourages wetting of the outer wall surface of the coaxial blowing nozzle 5 by the molten glass being blown. The wetting of the outer wall disrupts and interfers with blowing the microspheres.

The quench nozzles 18 are disposed below and on both sides of coaxial blowing nozzle 5 a sufficient distance apart to allow the microspheres 17 to fall between the quench nozzles 18. The inside diameter of quench nozzle orifice 18a can be 0.1 to 0.75 inch, preferably 0.2 to 0.6 inch and more preferably 0.3 to 0.5 inch. The quench nozzles 18 direct cooling fluid 19 at and into contact with the molten glass microspheres 17 at a velocity of 2 to 14, preferably 3 to 10 and more preferably 4 to 8 ft/sec to rapidly cool and solidify the molten glass and form a hard, smooth hollow glass microsphere.

The FIG. 3 of the drawings illustrates a preferred embodiment of the invention. It was found that in blowing molten glass compositions at high viscosities that it was advantageous to immediately prior to blowing the molten glass to provide by extrusion a very thin molten glass liquid film for blowing into the elongated cylinder shape liquid film 12. The thin molten glass liquid film 9' is provided by having the lower portion of the outer coaxial nozzle 7 tapered downwardly and inwardly at 21. The tapered portion 21 and inner wall surface 22 thereof can be at an angle of 15° to 75°, preferably 30° to 60° and more preferably about 45° relative to the center axis of coaxial blowing nozzle 5. The orifice 7a' can be 0.10 to 1.5 times, preferably 0.20 to 1.1 times and more preferably 0.25 to 0.8 times the inner diameter of orifice 6a of inner nozzle 6.

The thickness of the molten glass liquid film 9' can be varied by adjusting the distance of orifice 6a of inner nozzle 6 above orifice 7a of outer nozzle 7 such that the distance between the peripheral edge of orifice 6a and the inner wall surface 22 of tapered nozzle 21 can be varied. By controlling the distance between the peripheral edge of orifice 6a and the inner wall surface 22 of the tapered nozzle to form a very fine gap and by controlling the pressure applied to feed the molten glass 2 through annular space 8 the molten glass 2 can be squeezed or extruded through the very fine gap to form a relatively thin molten glass liquid film 9'.

The proper gap can best be determined by pressing the inner coaxial nozzle 6 downward with sufficient pressure to completely block-off the flow of glass, and to then very slowly raise the inner coaxial nozzle 6 until a stable system is obtained, i.e. until the microspheres are being formed.

The tapered nozzle construction illustrated in FIG. 3 is as mentioned above the preferred embodiment of the invention. This embodiment can be used to blow glass compositions at relatively high viscosities as well as to blow glass compositions at the relatively low viscosities referred to with regard to FIG. 2 of the drawings. The FIG. 3 embodiment of the invention is of particular advantage in blowing the thin walled microspheres for use in or as insulating materials.

When blowing high or low viscosity glass compositions, it was found to be advantageous to obtain the very thin molten glass fluid film and to continue during the blowing operation to supply molten glass to the elongated cylinder shaped liquid film as it was formed. Where a high pressure is used to squeeze, i.e. extruded, the molten glass through the very thin gap, the pressure of the inert blowing gas or metal vapor is generally less than the molten glass feed pressure, but slightly above the pressure of the molten glass at the coaxial blowing nozzle.

The tapered nozzle configuration of FIG. 3 is also particularly useful in aligning the laminar plane-orientable glass additive materials. The passage of the glass material through the fine or narrow gap serves to align the additive materials with the walls of the microspheres as the microspheres are being formed.

The FIGS. 3a and 3b of the drawings also illustrate a preferred embodiment of the invention in which the transverse jet 13 is flattened to form a generally rectangular or oval shape. The orifice 13a can also be flattened to form a generally oval or rectangular shape. The width of the orifice can be 0.96 to 0.030 inch, preferably 0.60 to 0.045 inch and more preferably 0.030 to 0.060 inch. The height of the orifice can be 0.32 to 0.010 inch, preferably 0.20 to 0.015 inch and more preferably 0.10 to 0.020 inch.

With reference to FIG. 3c of the drawings which illustrates an embodiment of the present invention in which a high viscosity glass material or composition is used to blow filamented hollow glass microspheres, there is shown the formation of the uniform diameter microspheres spaced about equal distances apart. The numbered items in this drawing have the same meanings as discussed above with reference to FIGS. 1, 2, 3, 3a and 3b.

With reference to FIG. 4 of the drawings which illustrates another embodiment of the invention, it was found that in blowing the molten glass to form the elongated cylinder shaped liquid film 12 that is was advantageous to increase the outer diameter of the lower portion coaxial blowing nozzle 5. One method of increasing the outer diameter of coaxial blowing nozzle 5 is by providing the lower portion of outer nozzle 7 with a bulbous member 23 which imparts to the lower portion of outer nozzle 7 a spherical shape. The use of the bulbous spherical shaped member 23 is found for a given velocity of the entraining fluid (FIG. 2) to substantially increase the amplitude of the pressure fluctuations induced in the region of the formation of the hollow microspheres. The diameter of the bulbous member 23 can be 1.25 to 4 times, preferably 1.5 to 3 times and more preferably 1.75 to 2.75 times the diameter of the outer diameter of coaxial blowing nozzle 5. When using a bulbous member 23, the transverse jet 13 is aligned such that a line drawn through the center axis of transverse jet 13 will pass through the center of bulbous member 23.

The FIG. 4 illustrates still another embodiment of the invention in which a beater bar 24 is used to facilitate detaching of the elongated cylinder shaped liquid film 12 from the orifice 7a of outer nozzle 7. The beater 24 is attached to a spindle, not shown, which is caused to rotate in a manner such that the beater bar 24 is brought to bear upon the pinched portion 16 of the elongated cylinder 12. The beater bar 24 is set to spin at about the same rate as the formation of hollow microspheres and can be 2 to 1500, preferably 10 to 800 and more preferably 20 to 400 revolutions per second. The beater bar 24 can thus be used to facilitate the closing off of the cylinder 12 at its inner pinched end 16 and to detach the cylinder 12 from the orifice 7a of outer nozzle 7.

The FIG. 8 of the drawings illustrates in graphic form the relationship between the thickness of the deposited zinc metal layer, the zinc metal vapor blowing gas pressure and the inside diameter* of the microspheres. The following table indicates the for specific ranges of microsphere sizes, the metal vapor blowing gas pressure required to obtain certain thicknesses of deposited metal.

*For the purposes of this illustration, the inside and outside diameter of the microspheres are considered to be about the same.

| Thickness of Deposited Metal Layer | Diameter of Microsphere (Microns) | Metal Vapor Blowing Gas Pressure (p.s.i.g.) |
|---|---|---|
| 25 to 100Å | 600–1000 | 1 |
| 100 to 275Å | 1000–2600 | 1 |
| 275 to 600Å | 1250–2750 | 16 |
| 600 to 1000Å | 1250–2250 | 45 |

DESCRIPTION OF THE MICROSPHERES

The hollow microspheres made in accordance with the present invention can be made from a wide variety of inorganic film forming materials and compositions, particularly glass compositions.

The hollow microspheres made in accordance with the present invention can be made from suitable inorganic film forming compositions. The compositions are preferably resistant to high temperatures and chemical attack, resistant to corrosive and alkali and resistant to weathering as the situation may require.

The compositions that can be used are those that have the necessary viscosities, as mentioned above, when being blown to form stable films and which have a rapid change from the molten or liquid state to the solid or hard state with a relatively narrow temperature change. That is, they change from liquid to solid within a relatively narrowly defined temperature range.

The hollow glass microspheres made in accordance with the present invention are preferably made from a low heat conductivity glass composition, they are substantially uniform in diameter and wall thickness, have a clear, hard, smooth surface and are resistant to chemical attack, high temperatures and weathering. The hollow glass microspheres are substantially uniform in diameter and wall thickness, and depending on their composition and blowing conditions are light transparent, translucent or opaque, soft or hard, and smooth or rough. The wall of the microspheres are free or substantially free of any holes, relatively thinned wall portions or sections, sealing tips, trapped gas bubbles, or sufficient amounts of dissolved gases to form bubbles. The microspheres are also free of any latent solid or liquid blowing gas materials or gases. The preferred glass compositions are those that are resistant to chemical attack, elevated temperatures, weathering and diffusion of gases into and/or out of the microspheres. Where the blowing gases may decompose at elevated temperatures, glass compositions that are liquid below the decomposition temperatures of the gases can be used.

The microspheres, because the walls are substantially free of any holes, thinned sections, trapped gas bubbles, and/or sufficient amounts of dissolved gases to form trapped bubbles, are substantially stronger than the microspheres heretofore produced. The absence of a sealing tip also makes the microsphere stronger.

The microspheres after being formed can be reheated to soften the glass and enlarge the microspheres and/or to improve the surface smoothness of the microspheres. On reheating, the internal gas pressure will increase and cause the microsphere to increase in size. After reheating to the desired size, for example, in a "shot tower", the microspheres are rapidly cooled to retain the increase in size.

This procedure can in some instances also be used to optimize the metal crystal size of the deposited metal layer. By carefully controlling the crystal size growth to produce discontinuites in the deposited metal layer or film, the heat conductivity properties of the metal layer are reduced, while the radiant heat reflecting properties of the metal layer are not adversely affected.

The glass microspheres can be made in various diameters and wall thickness, depending upon the desired end use of the microspheres. The microspheres can have an outer diameter of 200 to 10,000 microns, preferably 500 to 6,000 microns and more preferably 1,000 to 4,000 microns. The microspheres can have a wall thickness of 0.1 to 1,000 microns, preferably 0.5 to 400 microns and more preferably 1 to 100 microns.

The microspheres can contain an inert gas at superatmospheric pressure, about ambient pressure or a partial vacuum. The partial vacuum can be obtained by using a blowing gas which partially condenses within the microsphere.

The microspheres can contain a high vacuum in the enclosed volume where a metal vapor is used as a blowing gas and the metal vapor is cooled, condenses and deposits as a thin metal coating on the inner wall surface of the hollow microsphere. The pressure in the microsphere will be equal to the vapor pressure of the deposited metal at ambient temperature.

The thickness of the thin metal coating deposited on the inner wall surface of the microsphere will depend on the metal vapor used to blow the microsphere, the pressure of the metal vapor and the size of the microsphere. The thickness of the thin metal coating can be 25 to 1000 Å, preferably 50 to 600 Å, and more preferably 100 to 400 Å.

When it is specifically desired that the deposited metal coating be transparent, e.g. to sunlight, the coating should be less than 100 Å and preferably less than 80 Å. The transparent metal coated microspheres can have a deposited metal coating 25 to 95 Å and preferably 50 to 80 Å thick.

When it is specifically desired that the deposited metal coating be reflective, e.g. to sunlight, the coating should be more than 100 Å and preferably more than 150 Å thick. The reflective metal coated microspheres can have a deposited metal coating 105 to 600 Å and preferably 150 to 400 Å thick and more preferably 150 to 250 Å.

The diameter and wall thickness of the hollow microspheres will of course effect the average bulk density of the microspheres. The glass microspheres and glass vacuum microspheres prepared in accordance with the invention will have an average bulk density of 1 to 15 lb/ft$^3$, prferably 1.5 to 12 lb/ft$^3$ and more preferably 2 to 9 lb/ft$^3$. For use in a preferred embodiment to make low density insulating materials, the hollow glass microspheres can have an average bulk density as low as 0.5 to 1.5, for example 1.0 lb/ft$^3$.

Where the microspheres are formed in a manner such that they are connected by continuous thin glass filaments, that is they are made in the form of filamented microspheres, the length of the connecting filaments can be 1 to 40, usually 2 to 20 and more usually 3 to 15 times the diameter of the microspheres. The diameter, that is the thickness of the connecting filaments, can be 1/500 to 1/10, usually 1/2500 to 1/20 and more usually 1/1000 to 1/30 of the diameter of the microspheres.

The microspheres can contain a gas at superatmospheric pressure, about ambient pressure or at partial or hard, i.e. high, vacuum.

Where the microspheres are used as insulating materials and in insulating systems, or in syntactic foam systems, or as filler material in general, the microspheres can have an outer diameter of 200 to 5,000, preferably 500 to 3,000 and more preferably 750 to 2,000 microns. The microspheres can have a wall thickness of 0.1 to 500 microns, preferably 0.5 to 200 microns and more preferably 1 to 50 microns. The microspheres can have an average bulk density of 0.3 to 15 lb/ft$^3$, preferably 0.5 to 10 lb/ft$^3$ and more preferably 0.75 to 5.0 lb/ft$^3$. When used as insulating materials, the microspheres can contain a hard vacuum. When used as filler materials, the microspheres can have a contained gas pressure of 5 to 100 p.s.i.a., preferably 5 to 75 p.s.i.a. and more preferably 5 to 12 p.s.i.a.

In a preferred embodiment of the invention, the ratio of the diameter to the wall thickness of the microspheres is selected such that the microspheres are flexible, i.e. can be deformed under pressure without breaking.

The microspheres can contain a thin metal layer deposited on the inner wall surface of the microsphere where the blowing gas contains dispersed metal particles. The thickness of the thin metal coating deposited on the inner wall surface of the microsphere will depend on the amount and particle size of the dispersed metal particles or partial pressure of organo metal blowing gas that are used and the diameter of the microsphere. The thickness of the thin metal coating can be 25 to 10,000 Å, preferably 50 to 5,000 Å and more preferably 100 to 1,000 Å.

When it is desired that the deposited metal coating be transparent to light, the coating should be less than 100 Å and preferably less than 80 Å. The transparent metal coated microspheres can have a deposited metal coating 25 to 95 Å and preferably 50 to 80 Å thick. The microspheres, though transparent to visible light, are substantially reflective of infrared radiation.

When it is desired that the deposited metal coating be reflective to light, the coating can be more than 100 Å and preferably more than 150 Å thick. The reflective metal coated microspheres can have a deposited metal coating 105 to 600 Å, preferably 150 to 400 Å and more preferably 150 to 250 Å thick.

A particular and advantageous feature of the present invention is that the thickness of the thin deposited metal vapor layer can be selected such that the thermal conductivity of the metal forming the metal layer will be about one-fourth that of the thermal conductivity of the bulk metal. This substantial reduction in the thermal conductivity of the deposited metal vapor layer is, however, to some extent effected by the manner in which the metal layer is deposited.

The reduced thermal conductivity effect can be obtained with a deposited metal thickness of 25 Å to 250 Å, preferably 50 Å to 200 Å and more preferably 75 Å to 150 Å.

The thermal conductivity of the metal layer can be further reduced by controlling the metal layer deposition temperature in a manner such that metal crystal growth produces discontinuities in the deposited metal film.

The thermal heat conductivity characteristics of heat barriers made from the microspheres can be further improved by partially flattening the microspheres into an oblate spheroid shape. The thermal conductivity of the oblate spheroids is further improved by mixing with the oblate spheroids thin glass filaments. The filaments are preferably provided in the form of the filamented microspheres.

The filamented microspheres can as they are formed be drawn and laid on a conveyor belt or drum. A sufficient amount of tension can be maintained on the filamented microspheres as they are drawn to stretch them into the oblate spheroid shape. The filamented microspheres are maintained in that shape for a sufficient period of time to harden. After hardening of the filamented oblate spheroids, they can be laid in a bed, an adhesive and/or foam can be added and the filamented microspheres can be made into, e.g. a four by eight formed panel. The panel can be ¼ to 3 inches, for example, ½, 1, 1½ or 2 inches, in thickness.

The hollow glass microspheres of the present invention can be used to design systems having superior insulating characteristics. Where only hollow microspheres are used in which the contained volume has an inert low conductivity gas, systems can be designed in which the thermal conductivity can be as low as R11 per inch, for example, R3 to R11 per inch.

Where only the hollow glass microspheres having a low conductivity gas and low emissivity, reflective metal coating deposited on the inner wall surface thereof are used, systems can be designed in which the thermal conductivity can be as low as R15 per inch, for example, R5 to R15 per inch.

Where the hollow vacuum microspheres having a low emissivity, highly reflective metal coating deposited on the inner wall surface thereof are used, systems can be designed in which the thermal conductivity can be as low as R35 per inch, for example, R25 to R35 per inch.

Where an insulating system consisting essentially of hollow glass microspheres having a low emissivity, highly reflective metal coating deposited on the inner wall surface of the microsphere and a foamed material containing a low heat conductivity gas in the interstices are used, systems can be designed in which the thermal conductivity can be as low as R50 per inch, for example, R30 to R50 per inch.

Where an insulating system consisting essentially of filamented hollow glass vacuum oblate spheroid shaped microspheres having a low emissivity, highly reflective metal coating deposited on the inner wall surface of the microspheres and a foamed material containing a low heat conductivity gas in the interstices are used, systems can be designed to have a thermal conductivity as low as R70 per inch, for example, R40 to R70 per inch.

The microspheres can be used to make heat barriers by filling spaces between existing walls or other void spaces or can be made into sheets or other shaped forms by cementing the microspheres together with a suitable resin or other adhesive or by fusing the microspheres together and can be used in new construction.

When the hollow glass microspheres are massed together to form a heat barrier, there is substantially no heat transfer by solid conduction because of the point to point contact between adjacent spheres and the low conductivity of the glass material used to form the spheres. There is little heat transfer by convection because the characteristic dimensions of the voids between the packed spheres are below that necessary to initiate convection. There is substantially no heat transfer by gas conduction within the spheres when there is a high vacuum in the enclosed volume since the sphere diameter is smaller than the mean free path of the remaining gas molecules. The use of a low heat conductivity gas and/or foam in the interstices between the microspheres also reduces heat transfer by gas conduction. Where there is a low emissivity, highly reflective metal layer deposited on the inner wall surface of the microspheres, there is substantially no radiant heat transfer because of the highly reflective metal layer on the inner wall surface of the spheres. The primary mode of heat transfer remaining, therefore, is by gas conduction in the interstices or voids between the microspheres. The overall conductivity of the system is lower than that of the voids gas or foam because the voids gas or foam occupies only a fraction of the volume of the total system, and because conduction paths through the voids gas or foam are attenuated by the presence of the non-conducting microspheres.

The thermal heat conductivity characteristics of heat barriers made from the microspheres can be reduced by filling the interstices between the microspheres with smaller microspheres of the present invention, a low thermal conductivity gas, finely divided inert particles, e.g. low heat conductivity foam, e.g. of polyurethane, polyester or polyolefin resin foam or by enclosing the microspheres in a container and drawing a partial vacuum within the volume of the interstices between the microspheres.

The hollow glass microspheres of the present invention have a distinct advantage of being very strong and capable of supporting a substantial amount of weight. They can thus be used to make for the first time a simple inexpensive self-supporting or load bearing vacuum system.

A specific and advantageous use of the hollow glass microspheres has been in the manufacture of insulating systems for use in the construction of solar energy collectors.

EXAMPLES

EXAMPLE 1

A glass composition comprising the following constituents is used to make hollow glass microspheres.

|  | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 and 2 of the drawings. The molten glass passes through annular space 8 of blowing nozzle 5 and forms a thin liquid molten glass film across the orifices 6a and 7a. The blowing nozzle 5 has an outside diameter of 0.040 inch and orifice 7a has an inside diameter of 0.030 inch. The thin liquid molten glass film has a diameter of 0.030 inch and a thickness of 0.005 inch. An inert blowing gas consisting of xenon or nitrogen at a temperature of 2650° F. and at a positive pressure is applied to the inner surface of the molten glass film causing the film to distend downwardly into a elongated cylinder shape with its outer end closed and its inner end attached to the outer edge of orifice 7a.

The transverse jet is used to direct an inert entraining fluid which consists of nitrogen at a temperature of 2600° F. over and around the blowing nozzle 5 which entraining fluid assists in the formation and closing of the elongated cylinder shape and the detaching of the cylinder from the blowing nozzle and causing the cylinder to fall free of the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above the orifice 7a.

The free falling, i.e. entrained, elongated cylinders quickly assume a spherical shape and are rapidly cooled to about ambient temperature by a quench fluid consisting of a fine water spray at a temperature of 90° to 150° F. which quickly cools, solidifies and hardens the glass microspheres.

Clear, smooth, hollow glass microspheres having a 2000 to 3000 micron diameter, a 20 to 40 micron wall thickness and filled with xenon or nitrogen gas at an internal contained pressure of 3 p.s.i.a. are obtained. The microspheres are closely examined and are found to be free of any entrapped bubbles and/or holes and are particularly suitable for use as filler materials.

EXAMPLE 2

A glass composition comprising the following constituents is used to make transparent hollow glass vacuum microspheres.

|  | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 and 3 of the drawings. The molten glass is passed through annular space 8 of blowing nozzle 5 and into tapered portion 21 of outer nozzle 7. The molten glass under pressure is squeezed through a fine gap formed between the outer edge of orifice 6a and the inner surface 22 of the tapered portion 21 of outer nozzle 7 and forms a thin liquid molten glass film across the orifices 6a and 7a'. The blowing nozzle 5 has an outside diameter of 0.04 inch and orifice 7a' has an inside diameter of 0.01 inch. The thin liquid molten glass film has a diameter of 0.01 inch and a thickness of 0.003 inch. An inert zinc vapor blowing gas at a temperature of 2700° F. and at a positive pressure is applied to the inner surface of the molten glass film causing the film to distend outwardly into an elongated cylinder shape with its outer end closed and its inner end attached to the outer edge of orifice 7a'.

The transverse jet is used to direct an inert entraining fluid which consists of nitrogen at a temperature of 2600° F. over and around the blowing nozzle 5 which entraining fluid assists in the formation and closing of the elongated cylinder shape and the detaching of the cylinder from the blowing nozzle and causing the cylinder to fall free of the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The free falling elongated cylinders filled with the zinc vapor quickly assume a spherical shape. The microspheres are contacted with a quench fluid consisting of a fine water spray at at temperature of 90° to 150° F. which quickly cools, solidifies and hardens the molten glass prior to cooling and condensing the zinc vapor. The zinc vapor begins to condense at a temperature of about 1660° to 1670° F. at which the glass composition used to make the microspheres has already began to harden and has sufficient strength not to collapse as the zinc vapor begins to and condenses on the inner wall surface of the microsphere (see Tables 2 and 3). As the microsphere is further cooled, the zinc vapor condenses and deposits on the inner wall surface of the microsphere as a thin zinc metal coating.

Clear, smooth, hollow glass microspheres having an about 800 to 900 micron diameter, a 8 to 20 micron wall thickness and having a thin transparent zinc metal coating 85 to 95Å thick and an internal contained pressure of $10^{-6}$ Torr are obtained.

EXAMPLE 3

A glass composition comprising the following constituents is used to make low emissivity, reflective hollow glass vacuum microspheres.

|      | SiO$_2$ | Al$_2$O$_3$ | CaO | MgO | B$_2$O$_3$ | Na$_2$O |
| --- | --- | --- | --- | --- | --- | --- |
| Wt % | 55-57 | 18-22 | 5-7 | 10-12 | 4-5 | 1-2 |

The glass composition is heated to a temperature of 2650° to 2750° F. to form a fluid molten glass having a viscosity of 35 to 60 poises and a surface tension of 275 to 325 dynes per cm.

The molten glass is fed to the apparatus of FIGS. 1 and 3 of the drawings. The molten glass is passed through annular space 8 of blowing nozzle 5 and into tapered portion 21 of outer nozzle 7. The molten glass under pressure is squeezed through a fine gap formed between the outer edge of orifice 6a and the inner surface 22 of the tapered portion 21 of outer nozzle 7 and forms a thin liquid molten glass film across the orifices 6a and 7a'. The blowing nozzle 5 has an outside diameter of 0.05 inch and orifice 7a' has an inside diameter of 0.03 inch. The thin liquid molten glass film has a diameter of 0.03 inch and a thickness of 0.01 inch. An inert zinc vapor blowing gas at a temperature of 2600° F. and at a positive pressure is applied to the inner surface of the molten glass film causing the film to distend outwardly into an elongated cylinder shape with its outer end closed and its inner end attached to the outer edge of orifice 7a'.

The transverse jet is used to direct an inert entraining fluid which consists of nitrogen gas at a temperature of 2500° F. at a linear velocity of 40 to 100 feet a second over and around the blowing nozzle 5 which entraining fluid assists in the formation and closing of the elongated cylinder shape and the detaching of the cylinder from the blowing nozzle and causing the cylinder to fall free of the blowing nozzle. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The free falling elongated cylinders filled with the zinc vapor quickly assume a spherical shape. The microspheres are contacted with a quench fluid consisting of an ethylene glycol spray at a temperature of 0° to 15° F. which quickly cools, solidifies and hardens the molten glass prior to cooling and condensing the zinc vapor. The zinc vapor begins to condense at a temperature of about 1660° to 1670° F. at which the glass composition used to make the microspheres has already began to harden and has sufficient strength not to collapse as the zinc vapor begins to and condenses on the inner wall surface of the microspheres (see Tables 2 and 3). As the microsphere is further cooled, the zinc vapor condenses and deposits on the inner wall surface of the microsphere as a thin zinc metal coating.

Clear, smooth, hollow glass microspheres having an about 3000 to 4000 micron diameter, a 30 to 40 micron wall thickness and having a low emissivity, reflective zinc metal coating 325 to 450Å thick and an internal contained pressure of $10^{-6}$ Torr are obtained.

EXAMPLE 4

A glass composition comprising the following constituents is used to make low emissivity, reflective hollow glass vacuum filamented microspheres.

|      | SiO$_2$ | Al$_2$O$_3$ | CaO | MgO | B$_2$O$_3$ | Na$_2$O |
| --- | --- | --- | --- | --- | --- | --- |
| Wt % | 55-57 | 18-22 | 5-7 | 10-12 | 4-5 | 1-2 |

The glass composition is heated to a temperature of 2500° to 2600° F. to form a fluid molten glass having a viscosity of 100 to 200 poises.

The molten glass is fed to the apparatus of FIGS. 1 and 3 of the drawings under conditions similar to those used in Example 3.

An inert zinc vapor blowing gas at a temperature of 2400° F. and at a positive pressure is applied to the inner surface of the molten glass film causing the film to distend outwardly into an elongated cylinder shape with its outer end closed and its inner end attached to the outer edge of orifice 7a'.

The transverse jet is used to direct an entraining fluid which consists of nitrogen gas at a temperature of 2400° F. at a linear velocity of 5 to 40 feet a second over and around the blowing nozzle 5 which entraining fluid assists in the formation and closing of the elongated cylinder shape and the detaching of the cylinder from the blowing nozzle while trailing a thin glass filament which is continuous with the next microsphere forming at the blowing nozzle. The filamented microspheres are otherwise formed in the manner illustrated and described with reference to FIG. 3c of the drawings. The transverse jet is aligned at an angle of 35° to 50° relative to the blowing nozzle and a line drawn through the center axis of the transverse jet intersects a line drawn through the center axis of the blowing nozzle 5 at a point 2 to 3 times the outside diameter of the coaxial blowing nozzle 5 above orifice 7a'.

The entrained elongated filamented cylinder filled with the zinc vapor assumes a spherical shape. The filamented microspheres are contacted with a quench fluid consisting of water spray at a temperature of 60° to 100° F. which quickly cools, solidifies and hardens the molten glass prior to cooling and condensing the zinc vapor after which the zinc condenses on the inner wall surface of the microsphere.

Clear, smooth, hollow filamented glass microspheres having an about 1500 to 2500 micron diameter, a 1.5 to 5.0 micron wall thickness and having a low emissivity, reflective zinc metal coating 180 to 275Å thick and an internal contained pressure of $10^{-5}$ Torr are obtained. The lengths of the filament portions of the filamented microspheres is 10 to 20 times the diameter of the microspheres. The microspheres are closely examined and are found to be free of any entrapped bubbles and/or holes.

EXAMPLE 5

A glass composition comprising the following constituents is used to make low emissivity, reflective hollow glass microspheres containing a thin deposited metal layer which is deposited from dispersed metal particles.

| | $SiO_2$ | $Al_2O_3$ | CaO | MgO | $B_2O_3$ | $Na_2O$ |
|---|---|---|---|---|---|---|
| Wt % | 55–57 | 18–22 | 5–7 | 10–12 | 4–5 | 1–2 |

The glass composition is heated to a temperature of 2650° to 2750° F. to form a fluid molten glass having a viscosity of 35 to 60 poises.

The molten glass is fed to the apparatus of FIGS. 1 and 3 of the drawing under conditions similar to those used in Example 3.

A blowing gas consisting of argon and containing finely dispersed aluminum particles of 0.03 to 0.05 micron size at a temperature of 2700° F. and at a position pressure is applied to the inner surface of the molten glass film causing the film to distend outwardly into an elongated cylinder shape with its outer end closed and its inner end attached to the outer edge of orifice 7a'.

The transverse jet is used as before to direct an entraining fluid which consists of nitrogen gas at a temperature of 2500° F. over and around the blowing nozzle 5.

The entrained falling elongated cylinders filled with the argon gas containing the dispersed aluminum particles quickly assume a spherical shape. The microspheres are contacted with a quench fluid consisting of an ethylene glycol spray at a temperature of 0° to 15° F. which quickly cools, solidifies and hardens the molten glass. As the microspheres are further cooled and hardened, the aluminum particles deposit on the inner wall surface of the microsphere as a thin aluminum metal coating.

Clear, smooth, hollow glass microspheres having an about 1500 to 2500 micron diameter, a 5 to 15 micron wall thickness and having a low emissivity, reflective aluminum metal coating 600 to 1000 Å thick and an internal contained pressure about 5 p.s.i.a. are obtained. The microspheres as before are free of any trapped gas bubbles and/or holes.

EXAMPLE 6

An efficient flat plate solar energy collector, as illustrated in FIG. 5 of the drawings, is constructed using the glass vacuum microspheres of the present invention as a superior insulating material. A solar panel six feet long and three feet wide and about 3½ inches thick is constructed. The outer cover consists of a clear glass or weather resistant plastic ⅛ inch thick. The two sides, the upper and lower ends of the solar panel are constructed from metal or plastic panels having an inner reflective surface. There is disposed within the panel about midway between the top and bottom of the panel a black coated metal plate absorber with an absorbance of 0.90 and an emittance of 0.3 about ⅛ inch thick to the bottom surface which there are bonded a multiplicity of evenly spaced water heat exchange medium containing tubes. The tubes are of very thin wall construction and can have an outside diameter of about one inch. These tubes can also have a black coating. Suitable inlets and outlets are provided for the heat exchange medium.

The solar panel has an inner cover member about ⅛ to ¼ inch thick by means of which the panel can be attached to the roof of a home. The inner cover member can be made from metal or plastic and can have an inner reflective surface.

In accordance with the present invention, the area between the outer cover and the upper surface of the black coated metal absorber plate is filled to a depth of about one inch with transparent glass vacuum microspheres made by the method of Example 2 of about 800 micron diameter, 10 micron wall thickness and having a thin transparent zinc metal coating about 85 Å thick and an internal contained pressure of $10^{-6}$ Torr.

The area between the lower surface of the black coated metal absorber plate and the inner cover member is filled to a depth of about 1½ inches with the reflective glass vacuum microspheres made by the method of Example 3 of about 3000 micron diameter, 30 micron wall thickness and having a thin low emissivity, reflective zinc metal coating 325 Å thick and an internal contained pressure of $10^{-6}$ Torr.

The solar panel has suitable inlet and outlet means for the water heat exchange medium. On a bright sunny day with an outside temperature of 90° F., it is found that inlet water at a temperature of 80° F. is heated under pressure to an outlet temperature of 280° F. An outlet temperature of 280° F. is more than sufficient for summer air-conditioning needs. The outlet temperature of 280° F. is to be contrasted with a water outlet temperature of about 160° F. produced by conventional solar panels.

The same solar panel on a bright sunny day with an outside temperature of 32° F., it is found that inlet water at a temperature of 80° F. is heated to an outlet temperature of 180° F. An outlet temperature of 180° F. is more than sufficient for winter household heating and hot water requirements.

EXAMPLE 7

An efficient tubular solar energy collector, as illustrated in FIG. 6 of the drawings, is constructed using the glass vacuum microspheres of the present invention as a superior insulating material. A tubular solar collector six feet in length and about 4¼ inches in diameter is constructed. The outer cover consists of a clear glass or weather resistant plastic ⅛ inch thick. The two parallel sides and the lower curved portion are constructed from metal or plastic about ⅛ inch thick. The lower curved portion is coated with a highly reflective surface for reflecting and concentrating the sun's rays towards the center of the tubular collector. The tubular collector has end members closing the opposite ends constructed of similar material to that of the sides and lower curved portion which are also about ⅛ inch thick.

There is disposed within the solar collector and concentric to the lower curved portion of the collector a double pipe tubular member consisting of a thin walled inner feed tube and a thin walled outer return tube. The inner feed tube is coaxial to the outer return tube. The outer return tube has on its outer surface a black heat absorbing coating of the type described in Example 6. The inner feed tube can be one inch in diameter and the outer return tube can be two inches in diameter.

The tubular collectors are normally mounted in parallel in a manner such that they intercept the movement of the sun across the sky. In accordance with the present invention, the area between the outer cover, the sides and the lower curved portion and the double pipe tubular member is filled with transparent glass vacuum microspheres made by the method of Example 2 to provide an about one inch layer of transparent vacuum microspheres completely around the double pipe tubular member.

The transparent glass vacuum microspheres are 800 microns in diameter, have a wall thickness of 10 microns and a thin transparent zinc metal coating 85 Å thick and contain an internal pressure of $10^{-6}$ Torr.

The tubular solar energy collector has a suitable inlet and outlet means for a water heat exchange medium. On a bright sunny day with an outside temperature of 90° F., it is found that inlet water at a temperature of 80° F., on a single pass, is heated to an outlet temperature of 240° F. An outlet temperature of 240° F. is more than sufficient for summer air-conditioning needs. The same tubular solar energy collector on a bright sunny day with an outside temperature of 32° F., it is found that inlet water at a temperature of 80° F. is heated to an outlet temperature of 170° F. An outlet temperature of 170° F. is more than sufficient for winter household heating and hot water requirements.

EXAMPLE 8

THE FIG. 7 of the drawings illustrates the use of the hollow glass microspheres of the present invention in the construction of a one-inch thick formed wall panel. The wall panel contains multiple layers of uniform size glass microspheres made by the method of Example 4 of the invention The microspheres have a 1500 to 2500, e.g. 2000, micron diameter, a 1.5 to 5.0, e.g. 2.0, micron wall thickness and a thin low emissivity zinc metal coating 180 Å to 275 Å, e.g. 250 Å, thick deposited on the inner wall surface of the microsphere and an internal contained pressure of $10^{-5}$ Torr.

The interstices between the microspheres is filled with low heat conductivity foam containing Freon-11 gas. The microspheres and treated with a thin adhesive coating and formed into a ⅞ inch thick layer. The adhesive is allowed to cure to form a semi-rigid wall board. The facing surface of the wall board is coated with an about ⅛ inch thick plaster which is suitable for subsequent sizing and painting and/or covering with wall paper. The backing surface of the panel is coated with an about 1/16 inch coating of a suitable plastic composition to form a vapor seal. The final panels are allowed to cure. The cured panels form strong wall panels which can be sawed and nailed and readily used in construction of new homes. Several sections of the panels are tested and found to have a R value of 30 per inch.

EXAMPLE 9

The FIG. 7b of the drawings illustrates the use of the filamented hollow glass microspheres of the present invention in the construction of a formed wall panel one-inch thick. The wall panel contains hollow glass microspheres made by the method of Example 4. The microspheres have a 1500 to 2500, e.g. 2000, micron diameter, a 1.5 to 5.0, e.g. 2.0, micron wall thickness and a thin, low emissivity zinc metal coating 180 Å to 275 Å, e.g. 250 Å, thick deposited on the inner wall surface of the microsphere and an internal contained pressure of $10^{-5}$ Torr. A low heat conductivity resin adhesive foam containing Freon-11 gas is mixed with the microspheres and formed into a layer one-inch thick and pressed and flattened between two flat plates to form the microspheres into an oblate spheroid shape in which the ratio of the height to length of the flattened microspheres is about 1:3. The flattened microspheres are held in this position until the adhesive foam resin surrounding the microspheres cures after which microspheres retain their flattened shape.

The interstices between the microspheres are thus filled with a low heat conductivity foam containing Freon-11 gas. The facing surface of the wall board is about ⅛ inch plaster which is suitable for subsequent sizing and painting and/or covering with wall paper. The backing of the wall panel is about a 1/16 inch coating of plastic which forms a vapor seal. The panels are cured and form strong wall panels which can be sawed and nailed and readily used in construction of new homes. Several sections of the panel are tested and found to have a R value of 50 per inch.

EXAMPLE 10

The formed panels of Examples 8 and 9 can also be made to have a density gradient in the direction of the front to back of the panel. Where the panel is used indoors the surface facing the room can be made to have a relatively high density and high strength, by increasing the proportion of resin or other binder to microspheres. The surface facing the outside can be made to have relatively low density and a high insulation barrier effect by having a high proportion of microspheres to resin or binder. For example, the front one-third of the panel can have an average density of about two to three times that of the average density of the center third of the panel. The density of the back one-third of the panel can be about one-half to one-third that of the center third of the panel. Where the panels are used on the outside of a house, the sides of the panel can be reversed, i.e. the high density side can face outward.

UTILITY

The hollow glass microspheres of the present invention have many uses including the manufacture of superior insulating materials and the use of the microspheres as a filler or aggregate in cement, plaster and asphalt and synthetic construction board materials. The microspheres can also be used in the manufacture of insulated louvers and molded objects or forms.

The microsphere can be used to form thermal insulation barriers merely by filling spaces between the walls of refrigerator trucks or train cars, household refrigerators, cold storage building facilities, homes, factories and office buildings.

The hollow microspheres can be produced from inorganic film forming materials and compositions, from glass compositions and from high melting temperature glass compositions, and when used as a component in building construction retard the development and expansion of fires. The hollow microspheres and glass microspheres, depending on the composition from which made, are stable to many chemical agents and weathering conditions.

The microspheres can be bonded together by sintering or suitable resin adhesives and molded into sheets or other forms and used in new constructions which require thermal insulation including homes, factories and office buildings. The construction materials made from the microspheres can be preformed or made at the construction site.

The microspheres may be adhered together with known adhesives or binders to produce semi- or rigid cellular type materials for use in manufacturing various products or in construction. The microspheres, because they are made from very stable glass compositions, are not subject to degradation by outgassing, aging, moisture, weathering or biological attack and do not produce toxic fumes when exposed to very high temperatures or fire. The hollow glass microspheres when used in manufacture of superior insulating materials can advantageously be used alone or in combination with fiberglass, styrofoam, polyurethane foam, phenol-formaldehyde foam, organic and inorganic binders and the like.

The microspheres of the present invention can be used to make insulating industrial tapes and insulating, wallboard and ceiling tiles. The microspheres can also advantageously be used in plastic or resin boat construction to produce high strength hulls and/or hulls which themselves are buoyant.

The glass compositions can also be selected to produce microspheres that will be selectively permeable to specific gases and/or organic molecules. These microspheres can then be used as semi-permeable membranes to separate gaseous or liquid mixtures.

The process and apparatus of the present invention as mentioned above can be used to blow microspheres from suitable inorganic film forming materials or compositions having sufficient viscosity at the temperature at which the microspheres are blown to form a stable elongated cylinder shape of the material being blown and to subsequently be detached to form the spherical shaped microspheres and on cooling to form a hardened film.

The glass compositions can be transparent, translucent or opaque. A suitable coloring material can be added to the glass compositions to aid in identification of microspheres of specified size, wall thickness and contained gaseous material.

In carrying out the process of the present invention, the glass material to be used to form the microspheres is selected and can be treated and/or mixed with other materials to adjust their viscosity and surface tension characteristics such that at the desired blowing temperatures they are capable of forming hollow microspheres of the desired size and wall thickness.

The process and apparatus described herein can also be used to encapsulate and store gaseous material in hollow glass microspheres of a suitable non-interacting composition, thereby allowing storage or handling of gases generally, and of corrosive and toxic or otherwise hazardous gases specifically. Because of their small size and relative great strength, the gases may be encapsulated into hollow microspheres at elevated pressures, thus allowing high pressure storage of these gases. In the case where disposal by geological storage is desired, for example for poisonous and/or other toxic gases, the gases can be encapsulated in very durable alumina silicate or zirconia glass microspheres which can subsequently be embedded, if desired, in a concrete structure. The glass microspheres of the present invention, because they can be made to contain gases under high pressure, can be used to manufacture fuel targets for laser fusion reactor systems.

The process and apparatus of the invention can also be used to form hollow microspheres from metals such as iron, steel, nickel, gold, copper, zinc, tin, brass, lead, aluminum and magnesium. In order to form microspheres from these materials, suitable additives are used which provide at the surface of a blown microsphere a sufficiently high viscosity that a stable microsphere can be formed.

The process of the present invention can also be carried out in a centrifuge apparatus in which the coaxial blowing nozzles are disposed in the outer circumferal surface of the centrifuge. Liquid glass is fed into the centrifuge and because of centrifugal forces rapidly coats and wets the inner wall surface of the outer wall of the centrifuge. The liquid glass is fed into the outer coaxial nozzle. The inlet to the inner coaxial nozzle is disposed above the coating of liquid glass. The blowing gas is as before fed into the inner coaxial nozzle. The transverse jet entraining fluid is provided by transverse jets mounted on the outer surface of the rotating bowl. An external gas can be directed along the longitudinal axis of the centrifuge to assist in removing the microspheres from the vicinity of the centrifuge as they are formed. Quench fluids can be provided as before.

These and other uses of the present invention will become apparent to those skilled in the art from the foregoing description and the following appended claims.

It will be understood that various changes and modifications may be made in the invention, and that the scope thereof is not to be limited except as set forth in the claims.

I claim:

1. A method for making hollow microspheres from an inorganic film forming material which comprises heating said material, forming a liquid film of said material across an orifice, applying a blowing gas at a positive pressure on the inner surface of the liquid film to blow the film and form the microsphere, subjecting the microsphere during its formation to an external pulsating or fluctuating pressure field having periodic oscillations, said pulsating or fluctuating pressure field acting on said microsphere to assist in its formation and to assist in detaching the microsphere from said orifice.

2. The method of claim 1 wherein the liquid film of inorganic film forming material is formed across the orifice of a coaxial blowing nozzle, said blowing nozzle having an inner nozzle to convey said blowing gas to the inner surface of the liquid film, and an outer nozzle to convey said material to said orifice.

3. The method of claim 1 wherein the inorganic film forming material has a viscosity of 10 to 600 poises.

4. The method of claim 1 wherein the inorganic film forming material has a viscosity of 20 to 100 poises.

5. The method of claim 1 wherein the inorganic film forming material has a viscosity of 100 to 400 poises.

6. The method of claim 1 wherein the blowing gas pressure is sufficient to blow the microsphere and is less than 50 p.s.i.g.

7. The method of claim 1 wherein said blowing gas is an inert gas.

8. The method of claim 1 wherein the blowing gas contains dispersed metal particles.

9. The method of claim 1 wherein said blowing gas contains an organo metal compound.

10. The method of claim 1 wherein said blowing gas is a metal vapor.

11. The method of claim 2 wherein said blowing gas blows said film downwardly and outwardly to form an elongated cylinder shaped liquid film of said inorganic film forming material which is closed at its outer end and is connected at its inner end to the outer edge of the orifice of said blowing nozzle.

12. The method of claim 11 wherein the inorganic film forming material is continuously fed to said blowing nozzle while said elongated cylinder is being formed.

13. The method of claim 1 wherein an entraining fluid is directed at an angle to a coaxial blowing nozzle having an orifice, and inner nozzle and an outer nozzle, the liquid film of inorganic film forming material is formed across the orifice, the blowing gas is conveyed to the inner surface of the liquid film through said inner nozzle, the inorganic film forming material is conveyed through said outer nozzle to said orifice, and the entraining fluid passes over and around said coaxial nozzle to dynamically induce the pulsating or fluctuating pressure field at the opposite or lee side of the blowing nozzle in the wake or shadow of the coaxial blowing nozzle.

14. A method for making filamented, hollow glass microspheres having a high contained vacuum, which comprises heating glass to form molten glass, forming a liquid film of molten glass across an orifice of a coaxial blowing nozzle, said blowing nozzle having an inner nozzle to convey metal vapor blowing gas to the inner surface of the liquid film and an outer nozzle to convey molten glass to said orifice, the lower portion of said outer nozzle being tapered inwardly to form with the outer edge of the inner nozzle a fine gap, feeding the molten glass under pressure through said gap and forming said thin film of molten glass across said orifice of the blowing nozzle, applying said metal vapor blowing gas through said inner nozzle at positive pressure on the inner surface of the liquid film to blow the film downwardly and outwardly to form the microsphere, continuously feeding said molten glass to said outer nozzle while said microsphere is being formed, directing an entraining fluid at said coaxial blowing nozzle, at a linear velocity in the region of microsphere formation of about 1 to 50 feet per second to obtain connecting glass filaments between microspheres, and at an angle relative to a line drawn through the center axis of said coaxial blowing nozzle, said entraining fluid passing over and around said coaxial blowing nozzle to fluid dynamically induce a pulsating or fluctuating pressure fluid having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling, solidifying and hardening said microsphere to obtain microspheres of 500 to 6,000 microns diameter and 0.5 to 400 microns wall thickness, said microspheres being connected by thin filamented portions that are continuous with the glass microspheres, and depositing said metal vapor as a thin metal coating 50° to 600° A. thick on the innerwall surface of the microspheres to form filamented microspheres having a contained vacuum having a pressure at ambient temperature which is about the vapor pressure of said metal at ambient temperature.

15. The method of claim 13 wherein said entraining fluid has a linear velocity in the region of microsphere formation of 1 to 120 ft/sec and entrains and transports the microspheres away from the blowing nozzle.

16. The method of claim 15 wherein said entraining fluid has a linear velocity in the region of microsphere formation of 40 to 100 ft/sec.

17. The method of claim 15 wherein said entraining fluid has a linear velocity in the region of microsphere formation of 5 to 40 ft/sec.

18. The method of claim 13 wherein quench means direct a quench fluid into contact with said microsphere to rapidly cool and solidify said microsphere.

19. The method of claim 13 wherein said entraining fluid is directed at said coaxial blowing nozzle at an angle of 15° to 85° relative to a line drawn through the center axis of said coaxial blowing nozzle and said outer nozzle.

20. The method of claim 13 wherein said entraining fluid intersects said coaxial blowing nozzle at a point 0.5 to 4 times the outside diameter of the coaxial blowing nozzle above the orifice of said blowing nozzle.

21. The method of claim 13 wherein the lower portion of the outer nozzle is tapered inwardly to form with the outer edge of the inner nozzle a fine gap and the inorganic film forming material is fed under pressure and extruded through said gap to form a thin film of inorganic film forming material across the orifice of the blowing nozzle.

22. A method for making hollow glass microspheres which comprises heating glass to form molten glass, forming a liquid film of molten glass across an orifice, applying a blowing gas at a positive pressure on the inner surface of the liquid film to blow the film and form a microsphere, subjecting the microsphere during its formation to a pulsating or fluctuating pressure field having periodic oscillations, said pulsating or fluctuating pressure field acting on said microsphere to assist in its formation and to assist in detaching the microspheres from said orifice.

23. The method of claim 22 wherein said liquid film of molten glass is formed across the orifice of a coaxial blowing nozzle, said blowing nozzle having an inner nozzle to convey said blowing gas to the inner surface of the liquid film, and an outer nozzle to convey said molten glass to said orifice.

24. A method for making hollow glass microspheres which comprises heating glass to form molten glass, forming a liquid film of molten glass across an orifice of a coaxial blowing nozzle, said blowing nozzle having an inner nozzle to convey an inert gas or metal vapor blowing gas to the inner surface of the liquid film and an outer nozzle to convey said molten glass at a temperature of 2000° to 2800° F., to said orifice, applying said inert gas or a metal vapor blowing gas through said inner nozzle at positive pressure on the inner surface of the liquid film to blow the film downwardly and outwardly to form an elongated cylinder shaped liquid film of molten glass which is closed at its outer end and connected at its inner end to the outer edge of the orifice of said blowing nozzle, continuously feeding said molten glass to said nozzle while said elongated cylinder is being formed, directing an entraining fluid at said coaxial blowing nozzle at an angle of 25° to 75° relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, whereby said entraining fluid envelops and acts on the elongated cylinder to flap, fold, pinch and close-off said elongated cylinder at its inner end at a point proximate to the coaxial blowing nozzle and said entraining fluid acting through drag forces on said cylinder to detach the cylinder from the coaxial blowing nozzle whereby surface tension forces cause the cylinder to form a spherical shape microsphere and directing a quench fluid into contact with said microsphere to rapidly cool and solidify said microsphere.

25. The method of claim 24 wherein the blowing gas is an inert gas.

26. The method of claim 24 wherein the blowing gas is a metal vapor.

27. The method of claim 24 wherein the glass microspheres are 200 to 10,000 microns in diameter.

28. The method of claim 24 wherein the glass microspheres have a wall thickness of 0.1 to 1,000 microns.

29. The method of claim 24 wherein said entraining fluid intersects said coaxial blowing nozzle at a point 0.5 to 4 times the outside diameter of the coaxial blowing nozzle above the orifice of said blowing nozzle.

30. The method of claim 29 wherein said entraining fluid is directed at said coaxial blowing nozzle through a transverse jet disposed a distance of 0.5 to 14 times the outside diameter of the coaxial blowing nozzle away from the point of intersect of a line drawn along the center axis of the transverse jet and a line drawn along the center axis of the coaxial blowing nozzle.

31. The method of claim 24 wherein the blowing gas is a metal vapor, the microsphere is cooled, hardened and solidified and a thin metal coating is deposited on the inner wall surface of the microsphere.

32. The method of claim 24 wherein the blowing gas is a low heat conductivity gas and the microsphere is cooled, hardened and solidified.

33. The method of claim 24 wherein the lower portion of the outer nozzle is tapered inwardly to form with the outer edge of the inner nozzle a fine gap and the molten glass is fed under pressure through said gap to form a thin film of molten glass across the orifice of the blowing nozzle.

34. An apparatus for blowing hollow inorganic film forming material microspheres comprising a coaxial blowing nozzle consisting of an inner nozzle having an inner orifice at the lower end thereof for a blowing gas and an outer nozzle having an outer orifice for said material, said inner nozzle orifice being disposed proximate to said outer orifice, there being disposed external to said blowing nozzle means cooperating with said blowing nozzle by which there is induced a pulsating or fluctuating pressure field having periodic oscillations at the opposite or lee side of the blowing nozzle in the wake or shadow of said blowing nozzle.

35. An apparatus for blowing hollow glass microspheres comprising means for holding molten glass, a coaxial blowing nozzle consisting of an inner nozzle having an inner orifice at the lower end thereof for a blowing gas and an outer nozzle having an outer orifice for molten glass, said inner nozzle orifice being disposed proximate to said outer orifice, there being disposed external to said blowing nozzle a transverse jet cooperating with said blowing nozzle by which an entraining fluid is directed at said coaxial blowing nozzle at an angle of 25 to 75 relative to a line drawn through the center axis of said coaxial blowing nozzle such that said entraining fluid dynamically induces a pulsating or fluctuating pressure field having periodic oscillations at the opposite or lee side of the blowing nozzle in the wake or shadow of said blowing nozzle.

36. The apparatus of claim 35 wherein the lower portion of the outer nozzle is tapered inwardly.

37. The apparatus of claim 35 wherein the lower portion of the outer nozzle is enlarged by a bulbous member such that the lower portion of the outer nozzle is generally spherical in shape.

38. The apparatus of claim 35 wherein the transverse jet has a flattened orifice.

39. The method of claim 2 wherein pulsating or fluctuating pressure inducing means is directed at an angle to said coaxial blowing nozzle to induce a pulsating or fluctuating pressure field at the opposite or lee side of said coaxial blowing nozzle in the wake or shadow of said coaxial blowing nozzle.

40. The method of claim 23 wherein pulsating or fluctuating pressure inducing means is directed at an angle to said coaxial blowing nozzle to induce a pulsating or fluctuating pressure field at the opposite or lee side of said coaxial blowing nozzle in the wake or shadow of said coaxial blowing nozzle.

41. A method for making hollow glass microspheres which comprises heating glass to form molten glass, forming a liquid film of molten glass across an orifice of a coaxial blowing nozzle, said blowing nozzle having an inner nozzle to convey a blowing gas to the inner surface of the liquid film and an outer nozzle to convey said molten glass to said orifice, applying said blowing gas through said inner nozzle at positive pressure on the inner surface of the liquid film to blow the film downwardly and outwardly to form the microsphere, continuously feeding said molten glass to said outer nozzle while said microsphere is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling and solidifying said microsphere.

42. The method of claim 41 wherein the lower portion of the outer nozzle is tapered inwardly to form with the outer edge of the inner nozzle a fine gap and feeding the molten glass under pressure through said gap to form a thin film of molten glass across the orifice of the blowing nozzle.

43. The method of claim 41 wherein the blowing gas is a metal vapor, the microsphere is cooled, hardened and solidified and a thin metal coating is deposited on the inner wall surface of the microsphere.

44. An apparatus for blowing hollow inorganic film forming material microspheres comprising means for holding molten material, a coaxial blowing nozzle comprising an inner nozzle having an inner orifice at the lower end thereof for a blowing gas and an outer nozzle having an outer orifice for said molten material, and means for feeding said molten liquid material to said coaxial nozzle, said inner nozzle orifice being disposed proximate to said outer orifice, there being disposed external to said blowing nozzle means cooperating with said blowing nozzle by which there is induced a pulsating or fluctuating pressure field having periodic oscillations at the opposite or lee side of the blowing nozzle in the wake or shadow of said blowing nozzle.

45. The apparatus of claim 44 wherein the lower portion of the outer nozzle is tapered inwardly to form with the outer edge of the inner nozzle a fine gap.

46. An apparatus for blowing hollow glass microspheres comprising means for holding molten glass, a coaxial blowing nozzle comprising an inner nozzle having an inner orifice at the lower end thereof for a blowing gas and an outer nozzle having an outer orifice for the molten glass, and means for feeding said molten glass to said coaxial nozzle, said inner nozzle orifice being disposed proximate to said outer orifice, there being disposed external to said blowing nozzle a transverse jet cooperating with said blowing nozzle by which an entraining fluid is directed at said coaxial blowing nozzle at an angle relative to a line drawn through the center axis of said coaxial blowing nozzle such that said entraining fluid dynamically induces a pulsating or fluctuating pressure field having periodic oscillations at the opposite or lee side of the blowing nozzle in the wake or shadow of said blowing nozzle.

47. The apparatus of claim 46 wherein the lower portion of the outer nozzle is tapered inwardly to form with the outer edge of the inner nozzle a fine gap.

48. The apparatus of claim 46 wherein said transverse jet is directed at said coaxial blowing nozzle at an angle of 25° to 75° relative to said coaxial nozzle.

49. The apparatus of claim 46 wherein a line drawn along the center axis of the transverse jet intersects a line drawn along the center axis of the coaxial blowing nozzle at a point 0.5 to 4 times the outside diameter of the coaxial blowing nozzle above the orifice of said outer nozzle.

50. The apparatus of claim 46 wherein said transverse jet is disposed a distance of 0.5 to 14 times the outside diameter of the coaxial blowing nozzle away from the point of intersect of a line drawn along the center axis of the transverse jet and a line drawn along the center axis of the coaxial blowing nozzle.

51. A method for making hollow glass microspheres having a high contained vacuum which comprises heating glass to form molten glass, forming a liquid film of molten glass across an orifice of a coaxial blowing nozzle, said blowing nozzle having an inner nozzle to convey metal vapor blowing gas to the inner surface of the liquid film and an outer nozzle to convey molten glass to said orifice, the lower portion of said outer nozzle being tapered inwardly to form with the outer edge of the inner nozzle a fine gap, feeding the molten glass under pressure through said gap and forming said thin film of molten glass across said orifice of the blowing nozzle, applying said metal vapor blowing gas through said inner nozzle at positive pressure on the inner surface of the liquid film to blow the film downwardly and outwardly to form the microsphere, continuously feeding said molten glass to said outer nozzle while said microsphere is being formed, directing an entraining fluid at said coaxial blowing nozzle at an angle relative to a line drawn through the center axis of said coaxial blowing nozzle, said entraining fluid passing over and around said coaxial blowing nozzle to fluid dynamically induce a pulsating or fluctuating pressure field having periodic oscillations at the opposite or lee side of the blowing nozzle in the wake or shadow of said blowing nozzle, said entraining fluid acting on the microsphere to pinch and close-off the microsphere at a point proximate to the coaxial blowing nozzle and said entraining fluid acting to detach the microsphere from the coaxial blowing nozzle, surface tension forces causing the detached microsphere to form a spherical shape, and cooling, solidifying and hardening said microsphere to obtain microspheres of 500 to 6,000 microns diameter and 0.5 to 400 microns wall thickness, and depositing said metal vapor as a thin metal coating 50° to 600° A. thick on the innerwall surface of the microspheres to form microspheres having a contained vacuum having a pressure at ambient temperature which is about the vapor pressure of said metal at ambient temperature.

52. The method of claim 51 wherein the microspheres are partially flattened to form oblate spheroids.

53. The method of claim 51 wherein the blowing gas is zinc vapor, the microspheres are of substantially uniform diameter and wall thickness and there is deposited on the inner wall surface of the microspheres a thin transparent zinc metal coating less than 100° A. thick.

54. The method of claim 51 wherein the blowing gas is zinc vapor, the microspheres are of substantially uniform diameter and wall thickness and there is deposited on the inner wall surface of the microspheres a thin reflective zinc metal coating more than 100° A. thick.

55. The method of claim 14 wherein the microspheres are partially flattened to form oblate spheroids.

56. The method of claim 14 wherein the length of the connecting filaments is substantially equal and is 2 to 20 times the diameter of the microspheres.

57. The method of claim 14 wherein the length of the connecting filaments is substantially equal and the diameter of the connecting filaments is 1/2500 to 1/20 the diameter of the microspheres.

58. The method of claim 14 wherein the blowing gas is zinc vapor, the microspheres are of substantially uniform diameter and wall thickness, and there is deposited on the innerwall surface of the microspheres a thin zinc metal coating less than 100° A. thick and transparent to visible light.

59. The method of claim 14 wherein the blowing gas is zinc vapor, the microspheres are of substantially uniform diameter and wall thickness, and there is deposited on the inner wall surface of the microspheres a thin zinc metal coating more than 100° A. thick and reflective of visible light.

* * * * *